(12) United States Patent
Bishop

(10) Patent No.: US 10,633,076 B2
(45) Date of Patent: Apr. 28, 2020

(54) ROTATIONAL JOINT FOR AN AIRCRAFT FOLDING WING AND METHOD OF ASSEMBLY

(71) Applicant: Airbus Operations Limited, Bristol (GB)

(72) Inventor: Benjamin Bishop, Bristol (GB)

(73) Assignee: Airbus Operations Limited, Bristol (GB)

( * ) Notice: Subject to any disclaimer, the term of this patent is extended or adjusted under 35 U.S.C. 154(b) by 279 days.

(21) Appl. No.: 15/618,977

(22) Filed: Jun. 9, 2017

(65) Prior Publication Data

US 2017/0355440 A1 Dec. 14, 2017

(30) Foreign Application Priority Data

Jun. 9, 2016 (GB) .................................. 1610105.7

(51) Int. Cl.
 *B64C 3/56* (2006.01)
 *B64F 5/10* (2017.01)

(52) U.S. Cl.
 CPC . *B64C 3/56* (2013.01); *B64F 5/10* (2017.01)

(58) Field of Classification Search
 CPC ............... B64C 3/56; B64F 5/10; F16C 17/02
 See application file for complete search history.

(56) References Cited

U.S. PATENT DOCUMENTS

| | | | | |
|---|---|---|---|---|
| 5,219,232 A | * | 6/1993 | Adams | .................. F16C 13/006 384/275 |
| 6,343,406 B1 | | 2/2002 | Yeh | |
| 9,296,471 B2 | | 3/2016 | Sakurai et al. | |
| 2010/0264260 A1 | | 10/2010 | Hammerquist | |
| 2013/0341467 A1 | * | 12/2013 | Sakurai | ..................... B64C 3/56 244/201 |
| 2015/0204378 A1 | | 7/2015 | Teuiou et al. | |
| 2015/0336658 A1 | | 11/2015 | Habibvand et al. | |
| 2017/0152889 A1 | * | 6/2017 | Tyler | ....................... F16C 33/04 |
| 2017/0355437 A1 | * | 12/2017 | Bishop | ..................... B64C 3/56 |

(Continued)

FOREIGN PATENT DOCUMENTS

| | | |
|---|---|---|
| EP | 1 717 462 | 11/2006 |
| EP | 2306043 | 4/2011 |

(Continued)

OTHER PUBLICATIONS

Combined Search and Examination Report cited in GB1610105.7, dated Nov. 30, 2016, six pages.

*Primary Examiner* — Rodney A Bonnette
(74) *Attorney, Agent, or Firm* — Nixon & Vanderhye P.C.

(57) ABSTRACT

A method of rotatably couple a wing tip device (4) to a fixed wing (3) by a rotational joint (101) having an outer race (8) and an inner race (9) that is received in the outer race (8) one of the inner and outer races comprises a male member (76) and the other is a two-part assembly comprising a first part (9a) and a second part (9b) that together form a female member (72), the method brings the first and second parts together to form the female member (72) about the male member (76) such that the male member (76) is received in the female member (72) and fixing the first and second parts (9a, 9b) such that the race that is rotationally fixed relative to the wing tip device (4) is axially and radially retained relative to the race that is rotationally fixed relative to the fixed wing (3).

22 Claims, 21 Drawing Sheets

(56) References Cited

U.S. PATENT DOCUMENTS

2017/0355438 A1\* 12/2017 Bishop .................... B64C 3/56
2017/0355440 A1   12/2017 Bishop
2017/0355442 A1   12/2017 Winkelmann et al.
2017/0355444 A1   12/2017 Lorenz et al.
2018/0170519 A1\*  6/2018 Brakes .................... B64C 3/58

FOREIGN PATENT DOCUMENTS

| EP | 2 676 878 | 12/2013 |
|---|---|---|
| EP | 2 857 309 | 4/2015 |
| WO | 2011/051699 | 5/2011 |
| WO | 2015150835 | 10/2015 |
| WO | 2016203201 | 12/2016 |

\* cited by examiner

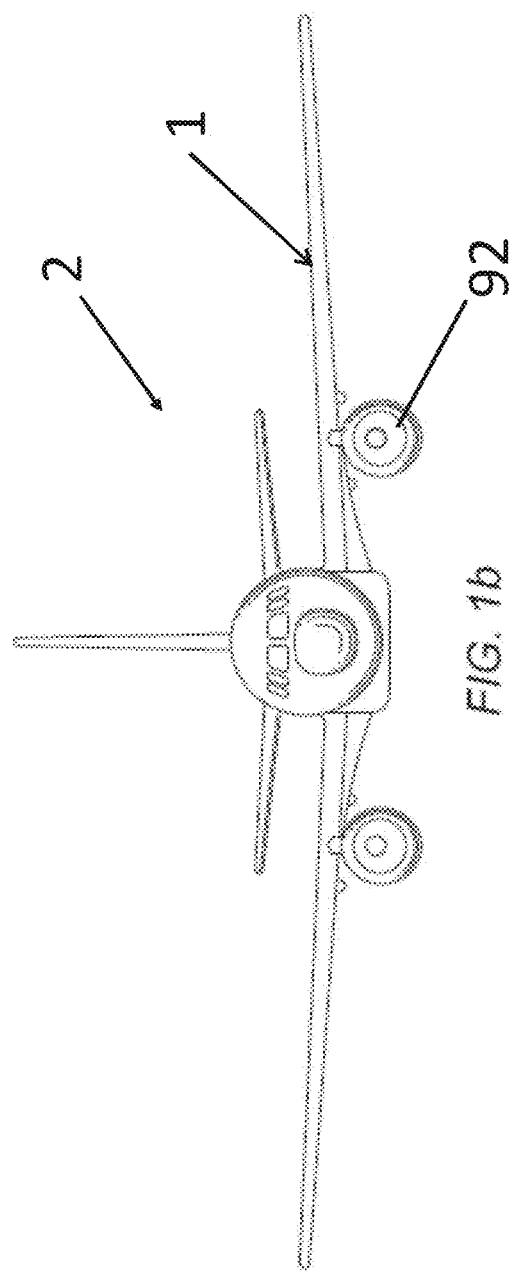

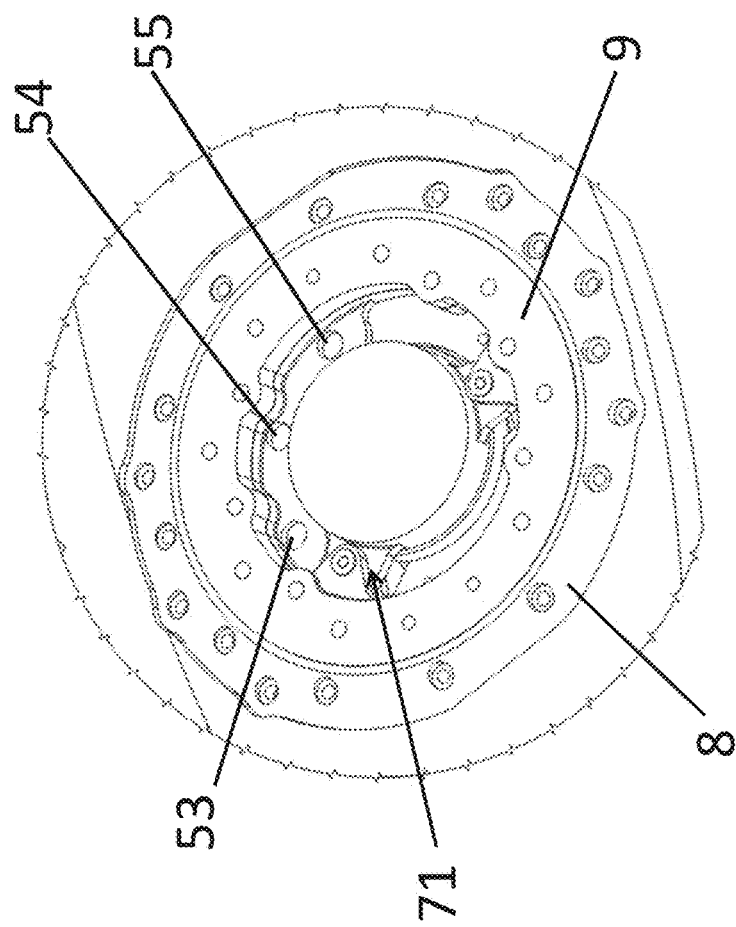
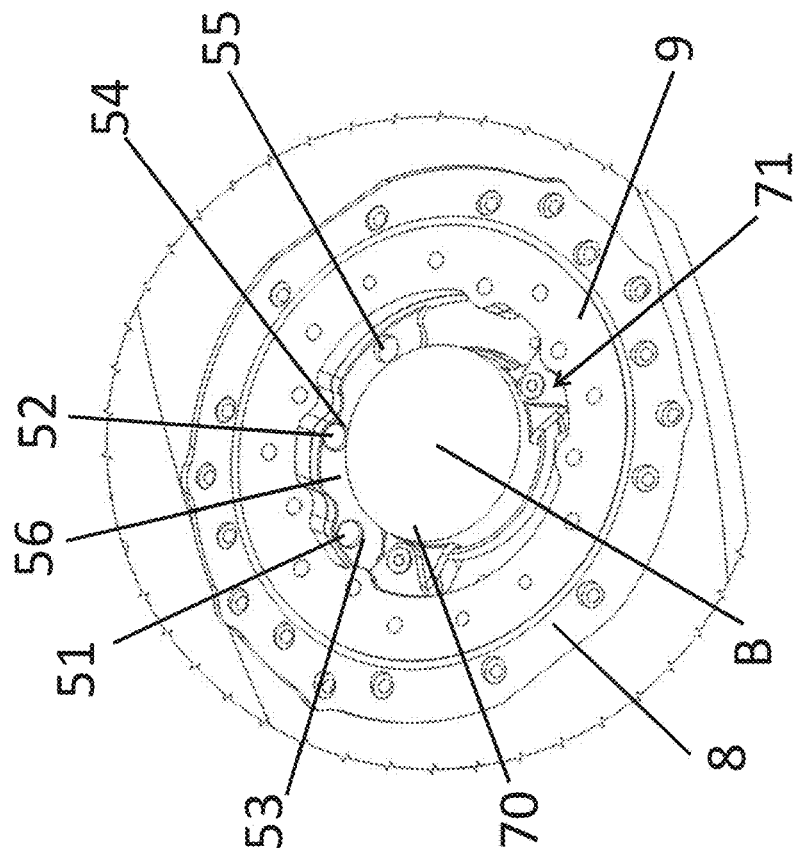

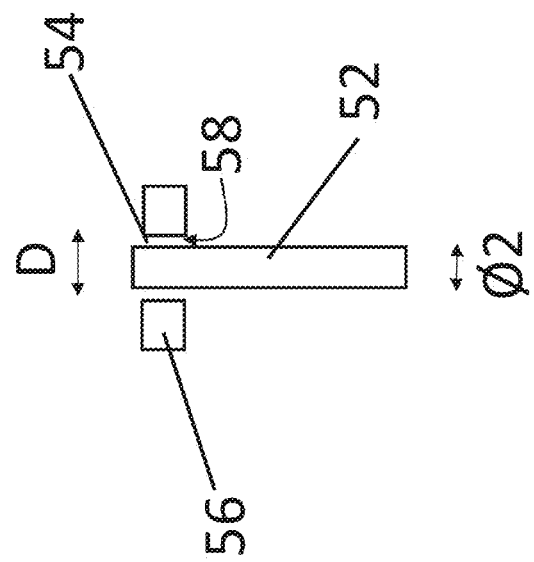
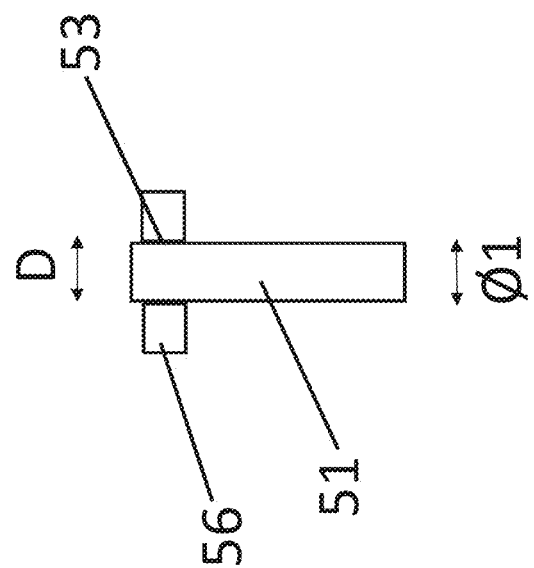

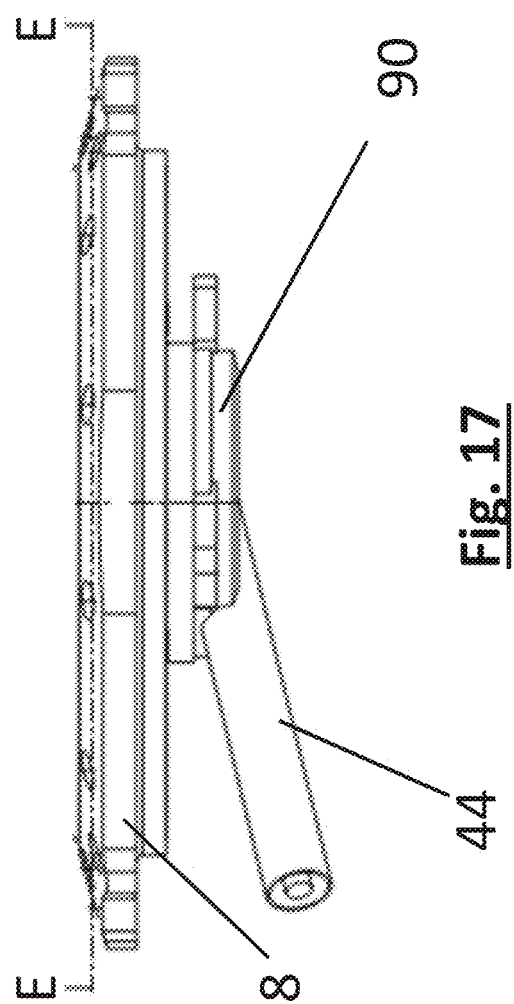

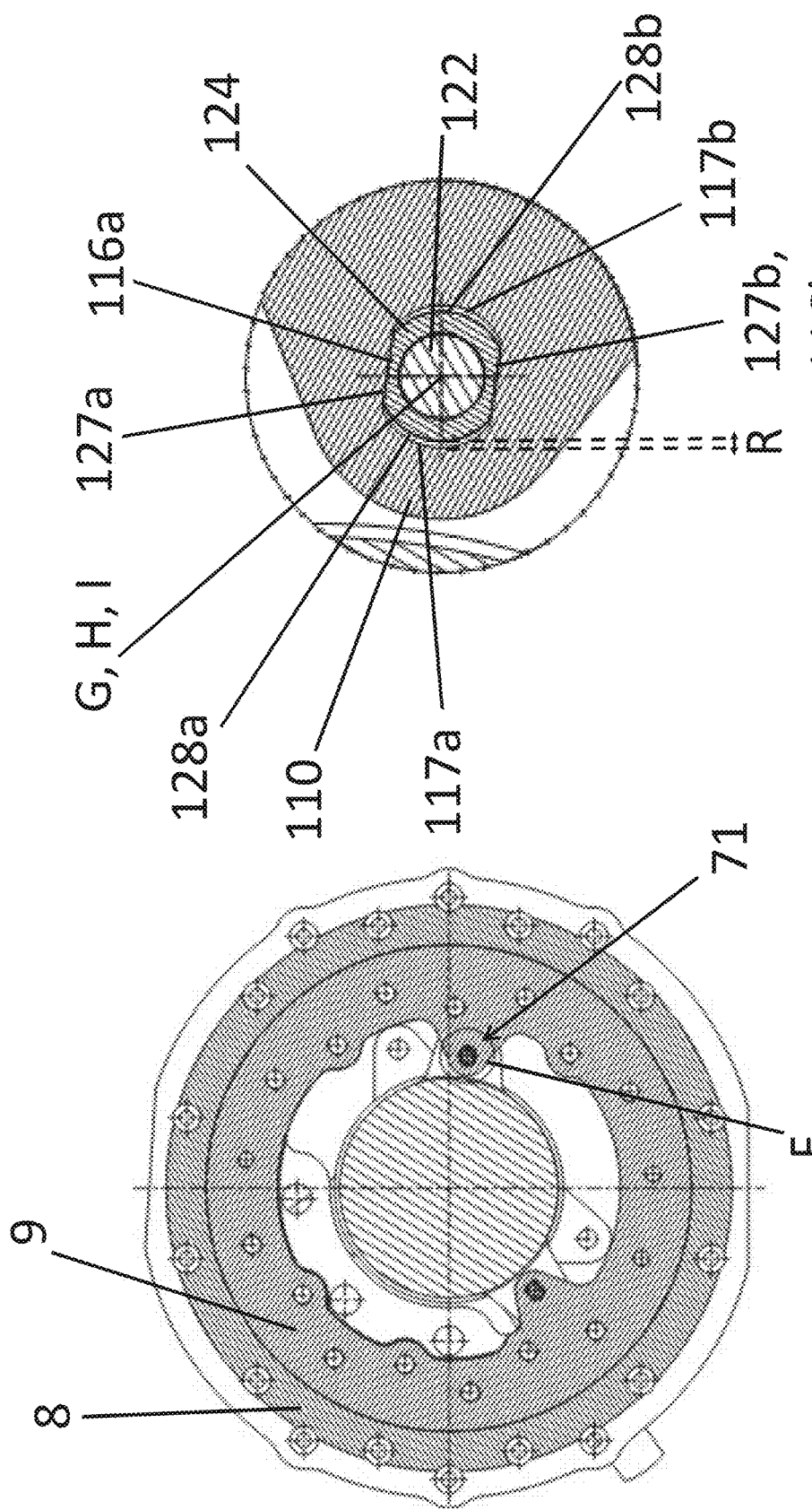

ROTATIONAL JOINT FOR AN AIRCRAFT FOLDING WING AND METHOD OF ASSEMBLY

RELATED APPLICATION

This application claims priority to and incorporates by reference United Kingdom (GB) patent application 1610105.7 filed Jun. 9, 2016.

BACKGROUND OF THE INVENTION

The present invention relates to aircraft comprising foldable wings, rotational joints for use on such aircraft and to methods of assembly of such rotational joints and foldable aircraft wings.

There is a trend towards increasingly large passenger aircraft with higher performance efficiency (for example fuel burn reduction), for which it is desirable to have correspondingly large wing spans. However, the maximum aircraft span is effectively limited by airport operating rules which govern various clearances required when maneuvering around the airport (such as the span and/or ground clearance required for gate entry and safe taxiway usage).

In some suggested designs, aircraft are provided with wings that have a fixed wing and a wing tip device that is rotatably coupled to the tip of the fixed wing, by a rotational joint, to rotate to a ground configuration in which the span of the aircraft is reduced (compared to when the aircraft is configured for flight).

However, it has been found to be difficult to assemble a rotational joint, for a foldable wing, that is able to transmit loads from the wing tip device to the fixed wing.

The present invention seeks to address or mitigate at least some of the above mentioned problems. Alternatively, or additionally, the present invention seeks to provide an improved method of assembly of a rotational joint for a rotatable wing device. Alternatively, or additionally, the present invention seeks to provide an improved method of assembly of an aircraft wing having a wing tip device rotatably coupled to a fixed part of the wing by a rotational joint. Alternatively, or additionally, the present invention seeks to provide an improved rotational joint for a rotatable wing tip device. Alternatively, or additionally, the present invention seeks to provide an improved aircraft with a wing tip device that is rotatable relative to the fixed wing.

SUMMARY OF THE INVENTION

According to a first aspect of the invention there is provided a method of assembly of an aircraft wing, the aircraft wing comprising a fixed wing and a wing tip device at the tip of the fixed wing, the wing tip device being rotatable relative to the fixed wing between a flight configuration for use during flight, and a ground configuration for use during ground-based operations, in which ground configuration the wing tip device is rotated relative to the fixed wing such that the span of the wing is reduced, the aircraft wing comprising a rotational joint that rotatably couples the wing tip device to the fixed wing, to allow the wing tip device to rotate relative to the fixed wing between the flight and ground configurations, the rotational joint comprising an outer race and an inner race that is received in the outer race, radially inwardly of the outer race, configured such that the inner and outer races are rotatable relative to each other about a rotational axis, one of the inner and outer races is rotationally fixed relative to the wing tip device and the other is rotationally fixed relative to the fixed wing such that as the wing tip device rotates relative to the fixed wing, the inner and outer races are rotated relative to each other about the rotational axis, one of the inner and outer races comprises a male member and the other comprises a female member, configured such that when the male member is received in the female member, the race that is rotationally fixed relative to the wing tip device is axially and radially retained relative to the race that is rotationally fixed relative to the fixed wing, wherein the race that comprises the female member is a two-part assembly comprising a first part and a second part that together form the female member and wherein the method comprises the steps of assembling the rotational joint by receiving the inner race in the outer race by bringing the first and second parts together to form the female member about the male member such that the male member is received in the female member and fixing the first and second parts relative to each other such that the race that is for being rotationally fixed relative to the wing tip device is axially and radially retained relative to the race that is for being rotationally fixed relative to the fixed wing.

As the race that is for being rotationally fixed relative to the wing tip device is axially and radially retained relative to the race that is for being rotationally fixed relative to the fixed wing, the rotational joint may transmit axial and radial loads exerted on the wing tip device to the fixed wing during use.

Assembling the female member from two-parts enables the female member to be assembled about the male member. It may otherwise be difficult or impossible to receive the male member in the female member, as the inner race is received in the outer race, since the male and female members are configured such that when the male member is received in the female member, the race that is rotationally fixed relative to the wing tip device is axially and radially retained relative to the race that is rotationally fixed relative to the fixed wing.

Accordingly the male and female members may otherwise clash, as the inner race is received in the outer race, such that the male member is prevented from being received in the female member. Therefore the method of assembly may allow, or facilitate, the assembly of the rotational joint and therefore of a wing comprising the rotational joint and of an aircraft comprising the wing.

In embodiments of the invention the method further comprises rotatably coupling the wing tip device to the fixed wing by the rotational joint. In embodiments of the invention the method further comprises rotationally fixing the race that is for being rotationally fixed relative to the wing tip device, to the wing tip device. In embodiments of the invention the method further comprises rotationally fixing the race that is for being rotationally fixed relative to the fixed wing, to the fixed wing.

Optionally the inner race is received in the outer race by bringing the first and second parts together from opposite axial sides of the male member to form the female member about the male member such that the male member is received in the female member.

Optionally the outer race comprises the male member and the inner race comprises the female member, wherein assembling the rotational joint comprises receiving the inner race in the outer race by receiving the first and second parts through opposite axial ends of the outer race and bringing the first and second parts together to form the female member about the male member.

Alternatively, optionally the inner race comprises the male member and the outer race comprises the female member. It will be appreciated that, in this case, assembling the rotational joint may comprise receiving the inner race in the outer race by positioning the first and second parts of the outer race radially outwardly of the inner race, on opposite axial sides of the inner race, and bringing them together over the inner race, to form the female member about the male member.

Optionally the inner and outer races are configured such that when the male member is received in the female member, the radially inner periphery of the outer race and the radially outer periphery of the inner race cooperate such that the race that is rotationally fixed relative to the wing tip device is radially retained relative to the race that is rotationally fixed relative to the fixed wing.

It will be appreciated that said radial retention refers to a limitation on the extent of the radial movement of the race that is rotationally fixed relative to the wing tip device, relative to the race that is rotationally fixed relative to the fixed wing.

In this regard, when the male member is received in the female member, the radially inner periphery of the outer race and the radially outer periphery of the inner race may be in abutment with each other such that the race that is rotationally fixed relative to the wing tip device is radially retained relative to the race that is rotationally fixed relative to the fixed wing.

Alternatively, said inner and outer peripheries may be spaced from each other in the radial direction, for example by a small gap. It will be appreciated that, in this case, the inner and outer peripheries may still cooperate to provide said radial retention, since they may be brought into abutment, as the race that is rotationally fixed relative to the wing tip device is moved radially relative to the race that is rotationally fixed relative to the fixed wing, to limit the extent of the relative radial movement.

In embodiments of the invention the radially inner periphery of the outer race and the radially outer periphery of the inner race cooperate such that said radial retention is in both radial directions (i.e. in first and second radial directions that are opposite to each other).

In this regard, optionally on opposite sides of the inner race, the radially inner periphery of the outer race and the radially outer periphery of the inner race cooperate to provide said radial retention in both radial directions.

It will be appreciated that, unless otherwise stated, references to axial, radial and circumferential directions are in relation to the rotational axis of the rotational joint.

Optionally the male and female members are configured such that when the male member is received in the female member, the male and female members axially overlap such that the race that is rotationally fixed relative to the wing tip device is radially retained relative to the race that is rotationally fixed relative to the fixed wing.

When the male member is received in the female member, the male and female members may be in abutment with each other. Alternatively, the male and female members may be spaced from each other in the radial direction, for example by a small gap. It will be appreciated that, in this case, the male and female members may still cooperate to provide said radial retention since they may be brought into abutment, as the race that is rotationally fixed relative to the wing tip device is moved radially relative to the race that is rotationally fixed relative to the fixed wing, to limit the extent of the relative radial movement.

Optionally an internal face of the female member defines a space for receiving the male member and, when the male member is received in the female member, the internal face of the female member axially overlaps the male member such that the race that is rotationally fixed relative to the wing tip device is radially retained relative to the race that is rotationally fixed relative to the fixed wing.

Optionally the male and female members are configured such that said radial retention is in both radial directions (i.e. opposite radial directions).

Optionally when the male member is received in the female member, the female member axially overlaps the male member on radially opposed sides (e.g. diametrically opposed sides) of the male member to provide said radial retention in both radial directions.

Optionally when the male member is received in the female member, the internal face of the female member axially overlaps the male member on radially opposed sides (e.g. diametrically opposed sides) of the male member to provide said radial retention in both radial directions.

Optionally when the male member is received in the female member, the inner and outer races are substantially radially fixed relative to each other.

Optionally when the male member is received in the female member, the inner race forms a close radial fit with the outer race.

Optionally when the male member is received in the female member, the male member forms a close radial fit with the female member.

Optionally the male and female member are each located at a radial periphery of the respective race. For example, where the outer race comprises the male member and the inner race comprises the female member, optionally the male member is located at the radially inner periphery of the outer race and the female member is located at the radially outer periphery of the inner race. Similarly, in the reverse arrangement, where the inner race comprises the male member and the outer race comprises the female member, optionally the male member is located at the radially outer periphery of the inner race and the female member is located at the radially inner periphery of the outer race.

Optionally the male and female members are configured such that when the male member is received in the female member, the male and female members radially overlap such that the race that is rotationally fixed relative to the wing tip device is axially retained relative to the race that is rotationally fixed relative to the fixed wing.

It will be appreciated that said axial retention refers to a limitation on the extent of the axial movement of the race that is rotationally fixed relative to the wing tip device, relative to the race that is rotationally fixed relative to the fixed wing.

Optionally when the male member is received in the female member, the male and female members may be in abutment with each other. Alternatively, they may be spaced from each other in the axial direction, for example by a small gap. It will be appreciated that, in this case, the male and female members may still cooperate to axially retain the inner and outer races relative to each other since they may be brought into abutment, as the inner and outer races are moved axially relative to each other, to limit the extent of relative axial movement.

Optionally an internal face of the female member defines a space for receiving the male member and, when the male member is received in the female member, the internal face of the female member radially overlaps the male member such that the race that is rotationally fixed relative to the wing tip device is axially retained relative to the race that is rotationally fixed relative to the fixed wing.

Optionally the male and female members are configured such that said axial retention is in both axial directions (i.e. opposite axial directions).

Optionally when the male member is received in the female member, the female member radially overlaps the male member on opposite axial sides of the male member to provide said axial retention in both axial directions.

Optionally when the male member is received in the female member, the internal face of the female member radially overlaps the male member on opposite axial sides of the male member to provide said axial retention in both axial directions.

Optionally the male and female members are configured such that when the male member is received in the female member, the inner and outer races are substantially axially fixed relative to each other.

Optionally when the male member is received in the female member, the male member forms a close axial fit with the female member.

The space defined by the internal face of the female member may be a groove, recess, or channel, for example.

The internal face of the female member may have a cross-sectional shape that is curved (i.e. the cross-sectional shape in a radial plane that is parallel to the rotational axis). The cross-sectional shape may be concavely curved. The cross-sectional shape may be a semi-circle.

An external face of the male member may have a cross-sectional shape that is curved (i.e. the cross-sectional shape in a radial plane that is parallel to the rotational axis). The cross-sectional shape may be convexly curved. The cross-sectional shape may be a semi-circle.

The internal face of the female member may have a complimentary shape to the external face of the male member.

The male member may be a radially extending protrusion.

The internal face of the female member may be formed by one or more surfaces of the female member, for example respective surfaces of the first and second parts that together form the female member.

The external face of the male member may be formed by one or more surfaces of the male member.

Optionally the male and female members are configured such that when the male member is received in the female member, substantially the entire surface areas of an internal face of the female member and of an external face of the male member are in contact with each other.

Optionally the contacting faces of the male and female members form complimentary shapes.

Optionally the male and female members are configured such that when the male member is received in the female member, the male member forms a zero clearance fit with the female member.

Optionally the male and female members are configured such that as the inner and outer races are rotated relative to each other, the male and female members cooperate with each other to guide the relative rotation.

Optionally an internal face of the female member and an external face of the male member are curved in the circumferential direction, about the rotational axis, to allow the male member to rotate relative to the female member, as the inner and outer races are rotated relative to each other. Optionally the male and female members extend entirely around the rotational axis.

Optionally each of the inner and outer races is arcuate.

Optionally each of the inner and outer races is a ring.

Optionally the rings are substantially circular.

Optionally the rings are substantially concentric with each other. Optionally the rings are substantially concentric with the rotational axis.

Optionally the first and second parts form opposite parts of the respective race, split along a radial plane that is perpendicular to the axial direction.

Optionally the radial plane is located substantially midway along the axial length of the respective race.

Optionally the inner race and/or the outer races is/are substantially symmetrical about the radial plane. Optionally the male and female members are substantially symmetrical about the radial plane.

Optionally the first and second parts are fixed relative to each other by at least one fastener, preferably a plurality of fasteners.

Optionally the at least one fastener is a releasable fastener such that the first and second parts may be detached from each other. This may advantageously allow for the rotational joint to be dissembled and repaired or replaced.

In embodiments of the invention, said radial retention is such that radial movement of the race that that is rotationally fixed relative to the wing tip device, relative to the race that is rotationally fixed relative to the fixed wing, to an extent that allows the male member to be radially removed from the female member (i.e. when the female member is assembled from said first and second parts) is prevented.

In embodiments of the invention, as the first and second parts are brought together they form a close radial fit with the race that comprises the male member.

In embodiments of the invention the first and second parts are brought towards each other from an unassembled state in which the first and second parts are not fixed relative to each other.

Optionally when the first and second parts are brought together to form the female member, the first and second parts are in contact with each other. Optionally the first and second parts are in contact with each other along said radial plane. Alternatively, when the first and second parts are brought together to form the female member, they may be spaced from each other.

Optionally the male member is integrally formed with the inner or outer race that comprises the male member. Alternatively, the male member may be separately formed to the inner or outer race that comprises the male member and attached to it.

Optionally the inner race is rotationally fixed relative to the wing tip device and the outer race is rotationally fixed relative to the fixed wing. Alternatively, the outer race may be rotationally fixed relative to the wing tip device and the inner race rotationally fixed relative to the fixed wing.

In embodiments of the invention the first and second parts are formed separately to each other.

Optionally when the aircraft wing is assembled, the wing tip device and the fixed wing are separated along an oblique cut plane passing through upper and lower surfaces of the wing, and the wing tip device is rotatable between the flight and ground configurations, about an axis of rotation oriented normal to the oblique cut plane, such that the fixed wing and the wing tip device do not clash when rotating between the flight and ground configurations.

According to a second aspect of the invention there is provided a method of assembly of an aircraft comprising assembling an aircraft wing according to the first aspect of the invention and assembling the aircraft wing with an aircraft fuselage.

According to a third aspect of the invention there is provided a method of assembly of a rotational joint for rotatably coupling a wing tip device to a fixed wing such that the wing tip device is rotatable relative to the fixed wing between a flight configuration for use during flight, and a ground configuration for use during ground-based operations, in which ground configuration the wing tip device is rotated relative to the fixed wing such that the span of the wing is reduced, the rotational joint comprising an outer race and an inner race that is received in the outer race, radially inwardly of the outer race, configured such that the inner and outer races are rotatable relative to each other about a rotational axis, one of the inner and outer races is for being rotationally fixed relative to the wing tip device and the other is for being rotationally fixed relative to the fixed wing such that as the wing tip device rotates relative to the fixed wing, the inner and outer races are rotated relative to each other about the rotational axis, one of the inner and outer races comprises a male member and the other comprises a female member, configured such that when the male member is received in the female member, the race that is for being rotationally fixed relative to the wing tip device is axially and radially retained relative to the race that is for being rotationally fixed relative to the fixed wing, wherein the race that comprises the female member is a two-part assembly comprising a first part and a second part that together form the female member, and wherein the method comprises the steps of receiving the inner race in the outer race by bringing the first and second parts together to form the female member about the male member such that the male member is received in the female member and fixing the first and second parts relative to each other such that the race that is for being rotationally fixed relative to the wing tip device is axially and radially retained relative to the race that is for being rotationally fixed relative to the fixed wing.

According to a fourth aspect of the invention there is provided an aircraft wing assembled according to the first aspect of the invention.

According to a fifth aspect of the invention there is provided an aircraft assembled according to the second aspect of the invention.

According to a sixth aspect of the invention there is provided a rotational joint assembled according to the third aspect of the invention.

According to a seventh aspect of the invention there is provided an aircraft wing comprising a fixed wing and a wing tip device at the tip of the fixed wing, the wing tip device being rotatable relative to the fixed wing between a flight configuration for use during flight, and a ground configuration for use during ground-based operations, in which ground configuration the wing tip device is rotated relative to the fixed wing such that the span of the wing is reduced, the aircraft wing comprising a rotational joint that rotatably couples the wing tip device to the fixed wing, to allow the wing tip device to rotate relative to the fixed wing between the flight and ground configurations, the rotational joint comprising an outer race and an inner race that is received in the outer race, radially inwardly of the outer race, configured such that the inner and outer races are rotatable relative to each other about a rotational axis, one of the inner and outer races is rotationally fixed relative to the wing tip device and the other is rotationally fixed relative to the fixed wing such that as the wing tip device rotates relative to the fixed wing, the inner and outer races are rotated relative to each other about the rotational axis, one of the inner and outer races comprises a male member and the other comprises a female member, wherein the male member is received in the female member such that the race that is rotationally fixed relative to the wing tip device is axially and radially retained relative to the race that is rotationally fixed relative to the fixed wing, wherein the race that comprises the female member is a two-part assembly comprising a first part and a second part that together form the female member and the first and second parts are assembled together to form the female member about the male member such that the male member is received in the female member, and the first and second parts are fixed relative to each other such that the race that is rotationally fixed relative to the wing tip device is axially and radially retained relative to the race that is rotationally fixed relative to the fixed wing.

The wing tip device and the fixed wing may be separated along an oblique cut plane passing through the upper and lower surfaces of the wing, the oblique cut plane being orientated normal to the axis of rotation. The oblique plane and the axis of rotation may be such that the fixed wing and the wing tip device do not clash when rotating between the flight and ground configurations. An example of a wing tip device that is rotatable in this manner is shown in WO 2015/150835. Embodiments of the present invention have been found to be especially effective in relation to this type of moveable wing tip device because of the limited internal space accessible during assembly.

The orientation of the axis is preferably such that when the wing tip device is rotated about the rotational axis, from the flight configuration to the ground configuration, the span of the aircraft wing is reduced.

The cut plane is oblique. The distance, along the upper surface of the wing, from the root of the wing to the cut plane (i.e. to where the cut plane intersects the upper surface) may be less than the distance, along the lower surface of the wing, from the root of the wing to the cut plane (i.e. to where the cut plane intersects the lower surface). Thus, the cut plane may create an overcut with respect to the fixed wing. In other embodiments, the distance, along the upper surface of the wing, from the root of the wing to the cut plane (i.e. to where the cut plane intersects the upper surface) may be more than the distance, along the lower surface of the wing, from the root of the wing to the cut plane (i.e. to where the cut plane intersects the lower surface). Thus, the cut plane may create an undercut with respect to the fixed wing.

The oblique cut plane is preferably a notional plane separating the fixed wing and the wing tip device (for example a cut plane created during the design phase of the wing). It will be appreciated that the cut plane need not necessarily manifest itself as a physical, planar, surface throughout the depth of the wing.

The axis of rotation may be orientated at an angle to (i.e. not including being parallel or perpendicular to a longitudinal direction. The axis is preferably at an angle to (i.e. not including being parallel or perpendicular to a lateral direction. The axis is preferably at an angle to (i.e. not including being parallel or perpendicular to a vertical direction. The vertical, longitudinal and lateral directions may be mutually perpendicular. In some embodiments, the longitudinal, lateral and vertical directions may be in an absolute frame of reference (i.e. longitudinal is fore-aft, lateral is port-starboard and vertical is vertical from the ground). The longitudinal direction may be a chordwise direction; the lateral direction may be a spanwise direction. In other embodiments, it may be appropriate to use the longitudinal, lateral and vertical directions in a frame of reference local to the wing. For example, for a swept wing the longitudinal direction may instead be along the length of the wing, and the lateral direction may be along the width of the wing (i.e. from the leading to the trailing edges, measured perpendicular to the longitudinal direction). Alternatively or additionally, for a wing with dihedral, the vertical direction may be perpendicular to the plane of the wing.

The wing tip device is preferably rotatable about a single axis of rotation. For example, the rotation of the wing tip device is preferably not the result of a compound rotation (i.e. a net rotation created by a plurality of separate rotations about separate axes).

The angle is preferably an oblique angle. The axis is preferably at an angle of less than 45 degrees, and more preferably less than 25 degrees, from the vertical. The axis may be at an angle of 15 degrees from the vertical axis. The present invention has been found to be especially beneficial in embodiments in which the axis is at a relatively small angle from the vertical because the orientation of axis results in a shallow cut plane and the area of the interface between the fixed wing and wing tip device may therefore be relatively large.

Optionally the wing tip device and the fixed wing are separated along an oblique cut plane passing through upper and lower surfaces of the wing, and the wing tip device is rotatable between the flight and ground configurations, about an axis of rotation oriented normal to the oblique cut plane, such that the fixed wing and the wing tip device do not clash when rotating between the flight and ground configurations.

According to an eighth aspect of the invention there is provided an aircraft comprising an aircraft wing according to the seventh aspect of the invention.

According to a ninth aspect of the invention there is provided a rotational joint for rotatably coupling a wing tip device to a fixed wing such that the wing tip device is rotatable relative to the fixed wing between a flight configuration for use during flight, and a ground configuration for use during ground-based operations, in which ground configuration the wing tip device is rotated relative to the fixed wing such that the span of the wing is reduced, the rotational joint comprising an outer race and an inner race that is received in the outer race, radially inwardly of the outer race, configured such that the inner and outer races are rotatable relative to each other about a rotational axis, one of the inner and outer races is for being rotationally fixed relative to the wing tip device and the other is for being rotationally fixed relative to the fixed wing such that as the wing tip device rotates relative to the fixed wing, the inner and outer races are rotated relative to each other about the rotational axis, one of the inner and outer races comprises a male member and the other comprises a female member, wherein the male member is received in the female member such that the race that is for being rotationally fixed relative to the wing tip device is axially and radially retained relative to the race that is for being rotationally fixed relative to the fixed wing, wherein the race that comprises the female member is a two-part assembly comprising a first part and a second part that together form the female member and the first and second parts are assembled together to form the female member about the male member such that the male member is received in the female member, and the first and second parts are fixed relative to each other such that the race that is for being rotationally fixed relative to the wing tip device is axially and radially retained relative to the race that is for being rotationally fixed relative to the fixed wing.

Optionally the rotational joint is configured such that the inner race is receivable in the outer race by bringing the first and second parts together from opposite axial sides of the male member to form the female member about the male member such that the male member is received in the female member.

Optionally the outer race comprises the male member and the inner race comprises the female member. In this case, the rotational joint may be configured such that the inner race is receivable in the outer race by receiving the first and second parts through opposite axial ends of the outer race and bringing the first and second parts together to form the female member about the male member.

According to a tenth aspect of the invention there is provided a wing tip device for coupling to a fixed wing of an aircraft wing by a rotational joint according to the ninth aspect of the invention, to rotate between a flight configuration for use during flight, and a ground configuration for use during ground-based operations, in which ground configuration the wing tip device is rotated relative to the fixed wing such that the span of the wing is reduced.

According to an eleventh aspect of the invention there is provided a wing tip device according to the tenth aspect of the invention attached to the rotational joint according to the ninth aspect of the invention.

According to an twelfth aspect of the invention there is provided a fixed wing of an aircraft having a wing tip for coupling to a wing tip device by a rotational joint according to the ninth aspect of the invention, such that the wing tip device is rotatable relative to the fixed wing between a flight configuration for use during flight, and a ground configuration for use during ground-based operations, in which ground configuration the wing tip device is rotated relative to the fixed wing such that the span of the wing is reduced.

According to an thirteenth aspect of the invention there is provided a fixed wing of an aircraft according to the twelfth aspect of the invention attached to the rotational joint according to the ninth aspect of the invention.

According to a fourteenth aspect of the invention there is provided a method of assembly of an aircraft wing, the aircraft wing comprising a fixed wing and a wing tip device at the tip of the fixed wing, the wing tip device being rotatable relative to the fixed wing between a flight configuration for use during flight, and a ground configuration for use during ground-based operations, in which ground configuration the wing tip device is rotated relative to the fixed wing such that the span of the wing is reduced, the aircraft wing comprising a rotational joint that rotatably couples the wing tip device to the fixed wing, to allow the wing tip device to rotate relative to the fixed wing between the flight and ground configurations, the rotational joint comprising an outer race and an inner race that is received in the outer race, radially inwardly of the outer race, configured such that the inner and outer races are rotatable relative to each other about a rotational axis, one of the inner and outer races is rotationally fixed relative to the wing tip device and the other is rotationally fixed relative to the fixed wing such that as the wing tip device rotates relative to the fixed wing, the inner and outer races are rotated relative to each other about the rotational axis, one of the inner and outer races comprises a male member and the other comprises a female member, configured such that when the male member is received in the female member, the race that is rotationally fixed relative to the wing tip device is axially and radially retained relative to the race that is rotationally fixed relative to the fixed wing, wherein the race that comprises the female member is a two-part assembly comprising a first part and a second part that together form the female member and wherein the method comprises the steps of assembling the rotational joint by receiving the inner race in the outer race by bringing the first and second parts together to form the female member about the male member such that the male member is received in the female member and fixing the first and second parts relative to each other such that the race that is rotationally fixed relative to the wing tip device is axially and radially retained relative to the race that is rotationally fixed relative to the fixed wing, the method further comprising rotatably coupling the wing tip device to the fixed wing by the rotational joint.

Optionally the aircraft comprises an actuator arranged to rotate the wing tip device between the flight and the ground configurations. The actuator may be arranged to drive the race that is rotationally fixed relative to the wing tip device. The actuator may be a rotary actuator.

Optionally a rotational drive member is rotatably coupled to the race that is rotationally fixed relative to the wing tip device. The rotational drive member may be a drive shaft. Optionally the drive shaft is substantially cylindrical. Optionally the rotational drive member is an output of a transmission.

Optionally the rotational drive member is coupled to an actuator, so as to be rotatably drivable by the actuator. Optionally the rotational drive member is coupled to the actuator by a transmission.

The transmission may be a reduction transmission. In this regard, the transmission may be configured to convert a high speed low torque input, from the actuator, into a low speed high torque (it will be appreciated that the terms 'high' and 'low' are being used relative to each other. The transmission may have an input to output gear ratio of 400:1, for example.

The transmission may be an epicylic transmission.

Preferably the actuator is an electric motor. However, it will be appreciated that any suitable type of actuator may be used.

The motor may be located outside the rotational joint and the drive shaft may extend into the rotational joint. The actuator may be a geared rotary actuator. The actuator may be a linear actuator.

The method of assembly of the aircraft wing and the method of assembly of the rotational joint may comprise the step of coupling the actuator to the rotational joint to rotate the wing tip device between the flight and the ground configurations.

In embodiments of the present invention, the wing tip device is configurable between: (i) a flight configuration for use during flight and (ii) a ground configuration for use during ground-based operations, in which ground configuration the wing tip device is moved away from the flight configuration such that the span of the aircraft wing is reduced.

In the flight configuration, the span may exceed an airport compatibility limit. In the ground configuration the span may be reduced such that the span (with the wing tip device in the ground configuration) is less than, or substantially equal to, the airport compatibility limit. The airport compatibility limit is a span limit (for example relating to clearance restrictions for buildings, signs, other aircraft). The compatibility limit is preferably a gate limit.

The wing tip device may be a wing tip extension; for example the wing tip device may be a planar tip extension. In other embodiments, the wing tip device may comprise, or consist of, a non-planar device, such as a winglet.

In the flight configuration the trailing edge of the wing tip device is preferably a continuation of the trailing edge of the fixed wing. The leading edge of the wing tip device is preferably a continuation of the leading edge of the fixed wing. There is preferably a smooth transition from the fixed wing to the wing tip device. It will be appreciated that there may be a smooth transition, even where there are changes in sweep or twist at the junction between the fixed wing and wing tip device. However, there are preferably no discontinuities at the junction between the fixed wing and wing tip device. The upper and the lower surfaces of the wing tip device may be continuations of the upper and lower surfaces of the fixed wing.

When the wing tip device is in the ground configuration, the aircraft incorporating the wing, may be unsuitable for flight. For example, the wing tip device may be aerodynamically and/or structurally unsuitable for flight in the ground configuration. The aircraft is preferably configured such that, during flight, the wing tip device is not moveable to the ground configuration. The aircraft may comprise a sensor for sensing when the aircraft is in flight. When the sensor senses that the aircraft is in flight, a control system is preferably arranged to disable the possibility of moving the wing tip device to the ground configuration.

The aircraft is preferably a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft is preferably a powered aircraft. The aircraft preferably comprises an engine for propelling the aircraft. The aircraft may comprise wing-mounted, and preferably underwing, engines.

It will of course be appreciated that features described in relation to one aspect of the present invention may be incorporated into other aspects of the present invention. For example, the method of any aspect of the invention may incorporate any of the features described with reference to the apparatus of any aspect of the invention and vice versa.

Other preferred and advantageous features of the invention will be apparent from the following description.

DESCRIPTION OF THE DRAWINGS

Embodiments of the present invention will now be described by way of example only with reference to the accompanying drawings of which:

FIG. 1b shows a front view of the passenger aircraft, where the wing tip device is in the flight configuration;

FIG. 4 is a perspective view of the rotational joint shown in FIGS. 2 and 3, where the wing tip device is locked in a flight configuration;

FIG. 5 is a view corresponding to that of FIG. 4, but where the wing tip device is unlocked in the flight configuration;

FIGS. 8a and 8b show a cross-sectional view of master and back-up pins, of the locking mechanism, received in first and second bores respectively, when the wing tip device is locked in the flight configuration;

FIG. 17 shows a side view of the rotational joint shown in FIG. 15;

FIG. 18 shows a cross-sectional view taken along the line E-E in FIG. 17;

FIG. 19 shows an enlarged view of the region F in FIG. 18;

DETAILED DESCRIPTION

Figure 1A:
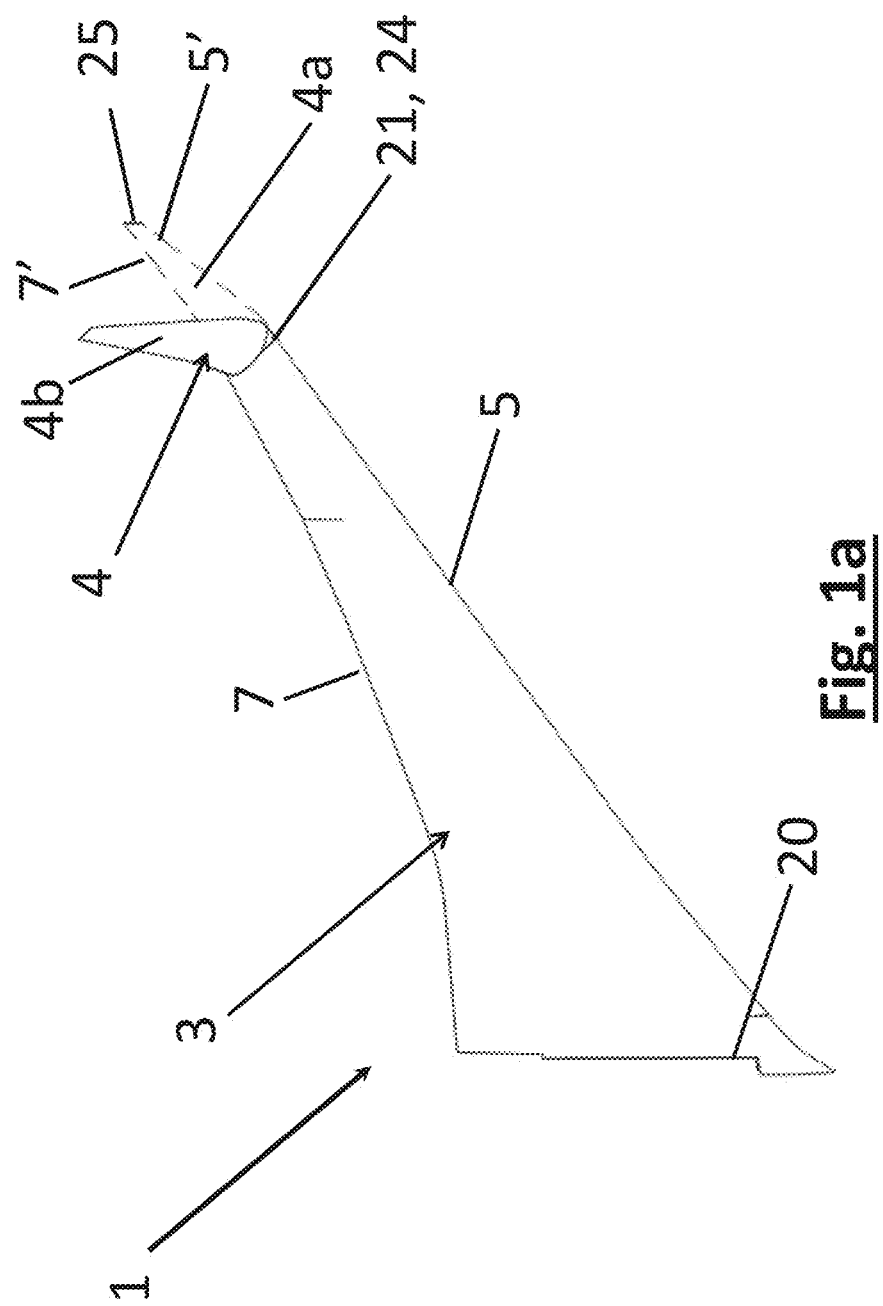
FIG. 1a shows a perspective view of a swept wing of a passenger aircraft according to an embodiment of the invention, where a wing tip device of the wing is shown in a flight configuration (shown as a dotted line) and in a ground configuration (shown as a solid line)

FIG. 1a is a perspective view of an aircraft wing 1 according to an embodiment of the invention, of an aircraft 2. The aircraft wing 1 comprises a fixed wing 3 and a wing tip device 4.

The aircraft 2 is a passenger aircraft comprising a passenger cabin comprising a plurality of rows and columns of seat units for accommodating a multiplicity of passengers, in this case more than 50 passengers. The aircraft is a powered aircraft and comprises engines 92, mounted under the wings 1, for propelling the aircraft 2.

The fixed wing 3 extends outboard from the fuselage of the aircraft, in a spanwise direction from a root 20 to a tip 21. The fixed wing 3 also extends in a chord-wise direction from a leading edge 5 to a trailing edge 7.

The wing tip device 4 is located at the outboard tip 21 of the fixed wing 3. In the described embodiment, the wing tip device 4 is in the form of a planar wing tip extension, although the invention is also applicable to other types of wing tip device (e.g. a non-planar wing tip device, such as a winglet).

The wing tip device 4 is moveable between a flight configuration 4a (shown as a dotted line in FIG. 1a) and a ground configuration 4b (shown as a solid line in FIG. 1a). When the wing tip device 4 is in the flight configuration it extends outboard in a spanwise direction, from an inboard end 24, located at the tip 21 of the fixed wing 3, to a tip 25. The wing tip device 4 also extends in a chord-wise direction from a leading edge 5' to a trailing edge 7'.

In the flight configuration, the leading and trailing edges 5', 7' of the wing tip device 4 are continuations of the leading and trailing edges 5, 7 of the fixed wing 3. Furthermore, the upper and lower surfaces of the wing tip device 4 device are continuations of the upper and lower surfaces of the fixed wing 3. Thus, there is a smooth transition from the fixed wing 3 to the wing tip device 4.

It will be appreciated that there may be a smooth transition, even where there are changes in sweep or twist at the junction between the fixed wing 3 and wing tip device 4. However, there are preferably no discontinuities at the junction between the fixed wing 3 and wing tip device 4.

The wing tip device 4 is placed in the flight configuration for flight. In the flight configuration the wing tip device 4 thus increases the span of the aircraft (thereby providing beneficial aerodynamic effects, for example, reducing the component of induced drag and increasing the lift). In principle, it would be desirable to maintain this large span at all times and simply have a large fixed wing. However, the maximum aircraft span is effectively limited by airport operating rules which govern various clearances required when maneuvering around the airport (such as the span and/or ground clearance required for gate entry and safe taxiway usage). In this regard, in the flight configuration the span may exceed an airport compatibility gate limit. Thus the wing tip device 4 is moveable to a ground configuration for use when the aircraft is on the ground.

In the ground configuration 4b the wing tip device 4 is folded, from the above-mentioned flight configuration, such that the wing tip device 4 rotates rearwards (aft), sweeping in an arc. When the wing tip device 4 is in the ground configuration, the span is reduced (as compared to when the wing tip device 4 is in the flight configuration) and the aircraft 2 thus complies with the above-mentioned airport clearances etc. In this regard, in the ground configuration the span may be reduced such that the span (with the wing tip device in the ground configuration) is less than, or substantially equal to, the airport compatibility gate limit.

When the wing tip device 4 is in the ground configuration, the aircraft 2 incorporating the wing 1 is unsuitable for flight. In this regard, the wing tip device 4 is aerodynamically and structurally unsuitable for flight in the ground configuration. The aircraft 2 is configured such that, during flight, the wing tip device 4 is not moveable to the ground configuration. The aircraft 2 comprises a sensor for sensing when the aircraft 2 is in flight. When the sensor senses that the aircraft 2 is in flight, a control system is arranged to disable the possibility of moving the wing tip device 4 to the ground configuration.

The wing tip device 4 and the fixed wing 3 are separated along an oblique cut plane 411 (see FIG. 3) passing through the upper and lower surfaces of the wing, the oblique cut plane 411 being orientated normal to the rotational axis B (see below). The oblique plane 411 and the rotational axis B is such that the fixed wing 3 and the wing tip device 4 do not clash when rotating between the flight and ground configurations. An example of a wing tip device 4 that is rotatable in this manner is shown in WO 2015/150835.

Figure 22A:
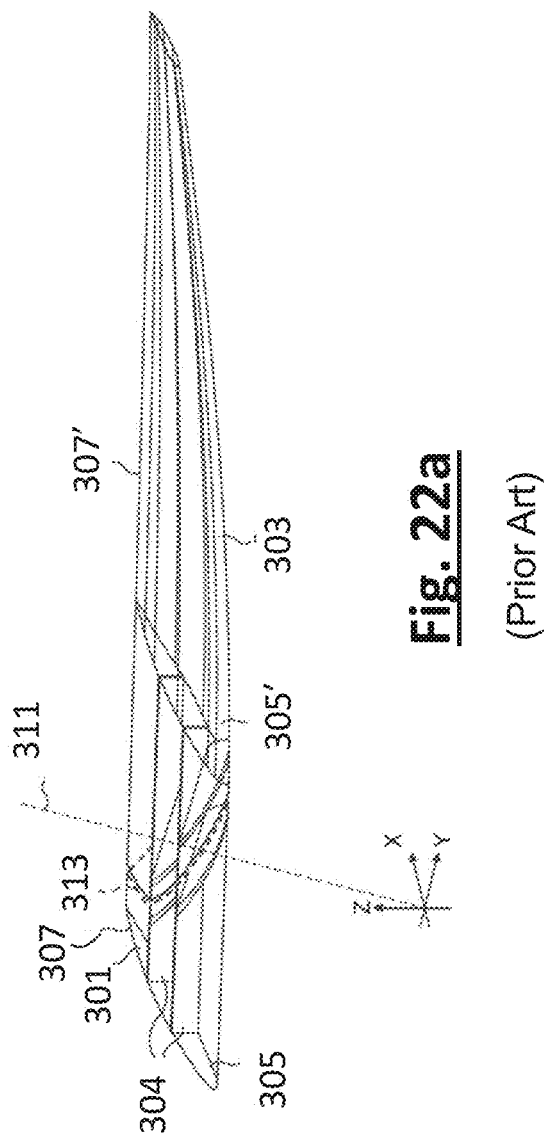
FIGS. 22a and 22b show a wing with a moveable wing tip device of the prior art.
Figure 22B:
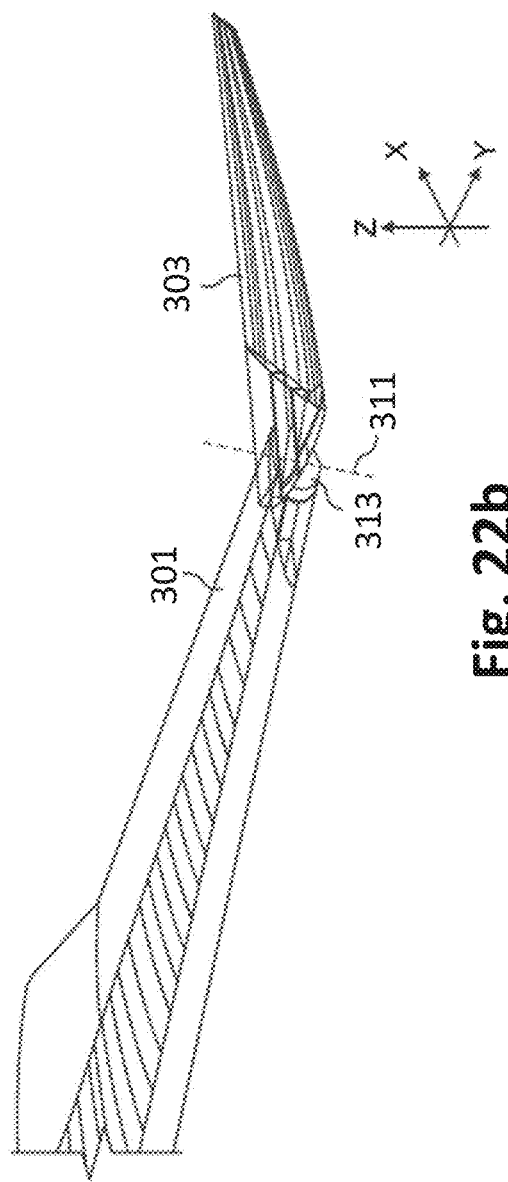

In this regard, FIG. 22*a* is a perspective view of a fixed wing 301 and a wing tip device 303 on an aircraft shown in WO2015/150835. In summary, the wing tip device 303 is moveable between a flight configuration (FIG. 22*a*) and a ground configuration (FIG. 22*b*). In the flight configuration, the leading and trailing edges 305', 307' of the wing tip device 303 are continuations of the leading and trailing edges 305, 307 of the fixed wing 301. Furthermore, the upper and lower surfaces of the wing tip device 303 are continuations of the upper and lower surfaces of the fixed wing 301.

In the ground configuration (FIG. 22*b*) the wing tip device 303 is folded, from the above-mentioned flight configuration, by rotating the wing tip device 303 about a rotational axis 311. By folding the wing tip device 303 in this manner, the span of the aircraft 302 is reduced. When the wing tip device 303 is in the ground configuration, the aircraft 302 thus complies with the above-mentioned airport clearances etc.

The movement of the wing tip device is determined by the type of joint about which the wing tip device rotates relative to the fixed wing. To achieve the above-mentioned movement, the wing tip device 303 and the fixed wing 301 are separated along an oblique cut plane 313 passing through the upper and lower surfaces of the wing. The wing tip device 303 is rotatable about the axis 311 that extends in a direction perpendicular to the oblique cut plane 313. The axis 311 is orientated at an acute angle to all three mutually perpendicular axes X, Y and Z (i.e. chordwise, spanwise and vertical).

The wing tip device 4 of the described embodiments of the invention is, in general terms, rotatable in a similar manner to that shown in FIGS. 22*a* and 22*b*. In other words, the wing tip device 4 is rotatable about the rotational axis B that is orientated normal to the oblique cut plane 411 separating the outer end of the fixed wing 3 and the inner end of the wing tip device 4, and that rotational axis B is at an acute angle to all three mutually perpendicular axes X, Y and Z (i.e. chordwise, spanwise and vertical).

Embodiments of the present invention have been found to be especially effective in relation to this type of moveable wing tip device 4 because of the limited internal space accessible during assembly.

Figure 2:
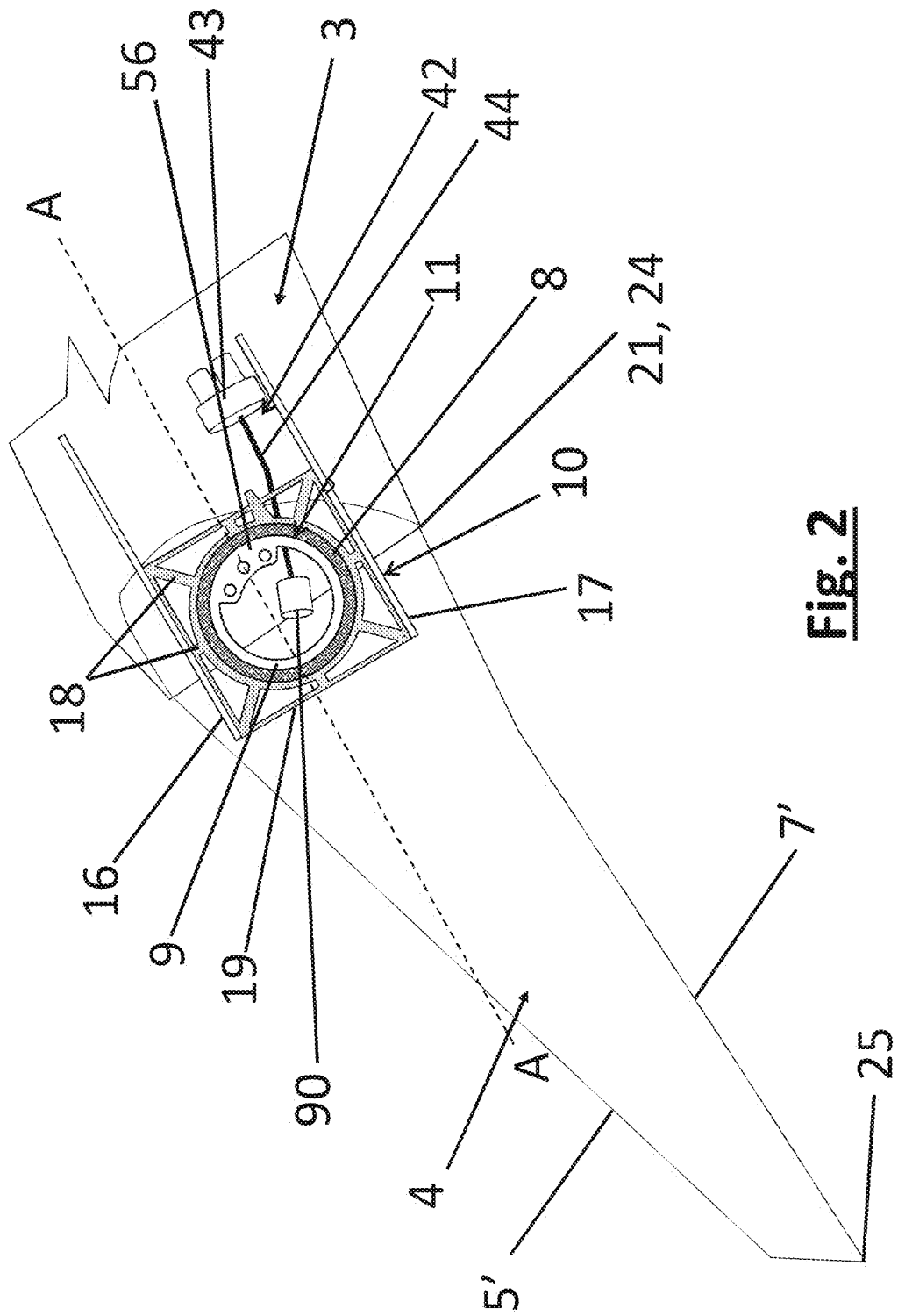
FIG. 2 shows a plan view of an end region of the wing of FIG. 1a, when the wing tip device is in the flight configuration, showing a rotational joint according to an embodiment of the invention, where parts of a rotational mechanism and locking mechanism are omitted for illustrative purposes and where parts of the wing skin of the wing tip device and of the fixed wing are shown in phantom so that the rotational joint can be seen.

Referring to FIG. 2, the aircraft 2 comprises a rotational joint 10. The rotational joint 10 comprises a rotation mechanism 11 that rotatably couples the wing tip device 4 to the fixed wing 3, to allow the wing tip device 4 to rotate between the flight and ground configurations 4*a*, 4*b*.

The rotation mechanism 11 is in the form of a slew ring, comprising an outer race 8 and an inner race 9. Each of the inner and outer races 8 are substantially circular rings. The inner race 9 is concentrically mounted within the outer race 8 and arranged to rotate within the outer race 8.

The outer race 8 is mounted to the fixed wing 3 such that the outer race 8 is rotationally fixed relative to the fixed wing 3.

In this regard, the outer race 8 is mounted between the front and rear spars 16, 17 of the fixed wing 3, and is attached to the spars 16, 17, by a plurality of elongate stiffeners 18 that extend radially outwardly from the outer race 8 to an inner square frame 19 that has front and rear members that are attached to the front and rear spars 16, 17 respectively.

The outer race 8 is also attached to the outboard rib 31 of the fixed wing 3 by a plurality of fasteners distributed circumferentially around the outer race 8. Each fastener comprises a bolt 32, that passes through aligned bores in the outer race 8 and the outboard rib 31 and a nut 33 engaged, via a screw thread, on the end of the bolt 32 external to the outboard rib 31 (see FIG. 3). The wing skin 40 of the fixed wing 3 is attached to the outboard rib 31. In this regard, the outboard rib 31 provides support and rigidity to the wing skin 40.

The inner race 9 is nested within the outer race 8 and is concentric with the outer race 8. In this regard, the outer race 8 and the inner race 9 are both centred on a common central axis B.

The inner race 9 is arranged to rotate about the rotational axis B. In the embodiment of the invention shown in FIG. 3, the inner race 9 has a 'V-shaped' radially outer surface that bears against a complementary 'V-shaped' radially inner surface of the outer race 8 such that the inner race 9 acts a follower and the outer race 9 acts as a guide, to guide the rotation of the inner race 9.

The inner race 9 is rotationally fixed relative to the wing tip device 4 such that the wing tip device 4 rotates with the inner race 9, between the flight and ground configurations, about the rotational axis B.

In this regard, the inner race extends, in the axial direction, from an upper radial face 83 to a lower radial face 84. The inner race 9 is attached to the inboard rib 34 of the wing tip device 4 by a plurality of fasteners, in the form of bolts 35 that each pass through aligned bores in the inner race 9 and the inboard rib 34 and a nut 36 engaged, via a screw thread, on the end of the bolt 35 external to the inboard rib 34. The wing skin 41 of the wing tip device 4 is attached to the inboard rib 34. In this regard, the inboard rib 34 provides support and rigidity to the wing skin 41.

Figure 3:
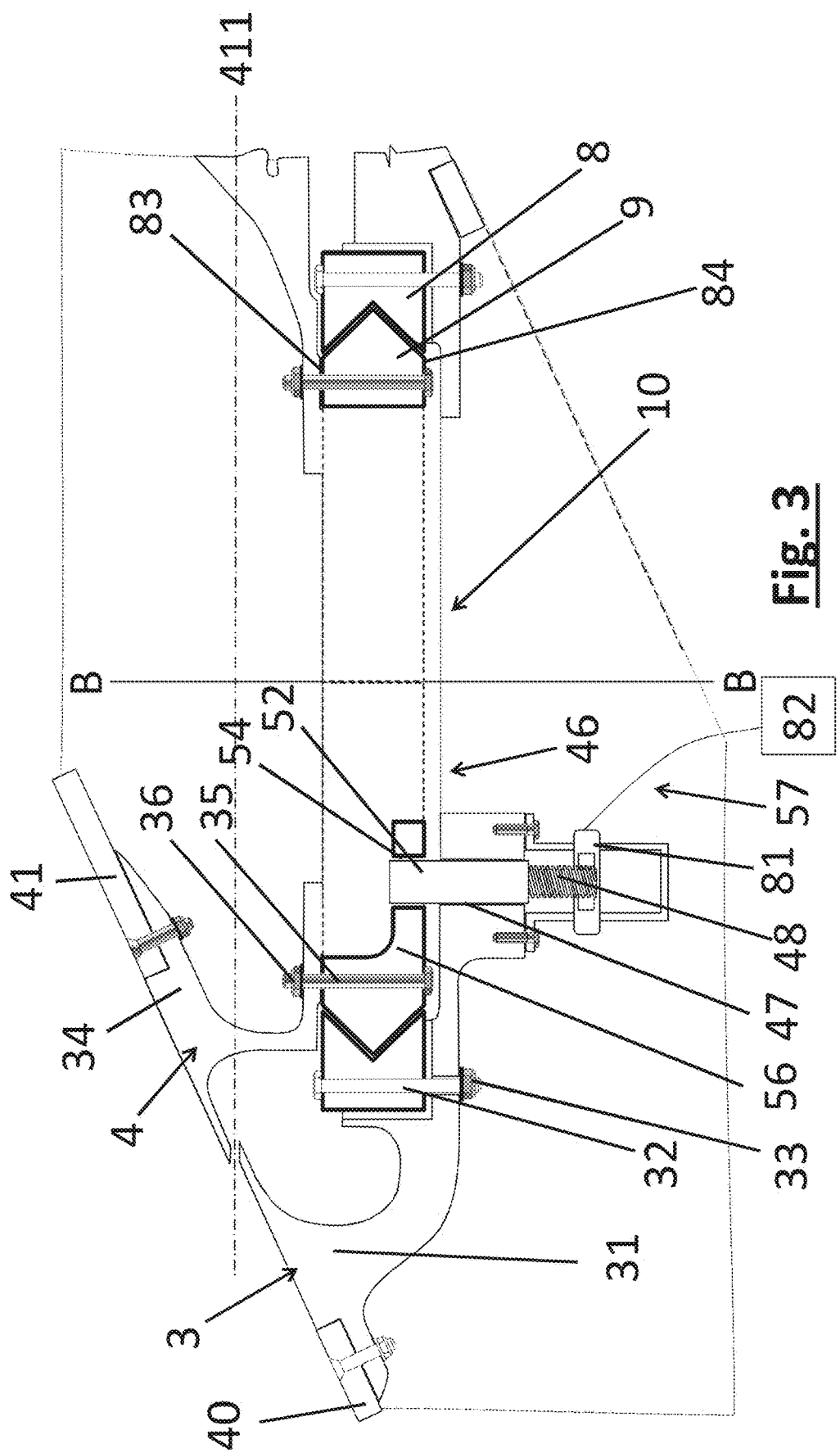
FIG. 3 is a cross-sectional view of adjacent portions of the fixed wing and wing tip device, where the wing tip device is in the flight configuration, taken along the line A-A in FIG. 2.

A rotational drive member in the form of a drive shaft 70 is located radially inwardly of the inner race 9 (the drive shaft 70 is omitted from FIGS. 2 and 3 for illustrative purposes but is shown in FIGS. 4 to 7 and 10). The drive shaft 70 has a central longitudinal axis C (see FIG. 10) that is co-axial with the rotational axis B. The drive shaft 70 is arranged to rotate about its rotational axis C.

The drive shaft 70 is connected to an electric motor 43 (see FIG. 2) via an epicylic (planetary) transmission 90. In this respect, the electric motor 43 rotatably drives an input shaft 44. The transmission 90 couples the input shaft 44 to the drive shaft 70, which may be regarded as forming an output shaft.

The transmission 90 is a reduction transmission. In this regard, the transmission 90 is configured to convert a high speed low torque input, from the electric motor 43, into a low speed high torque (it will be appreciated that the terms 'high' and 'low' are being used relative to each other. The transmission 90 has an input to output gear ratio of 400:1. The motor 43, input shaft 44, transmission 90 and drive shaft 70 together form a 'geared rotary actuator' 42.

As described in more detail below, the drive shaft 70 is coupled to the inner race 9, such that the rotation of the drive shaft 70 rotates the inner race 9 by pairs of pinned lug joints 71 distributed in the circumferential direction about the rotational axis B (see FIGS. 4 and 5).

Since the inner race 9 is fixed to the inboard rib 34 of the wing tip device 4, this in turn rotates the wing tip device 4 between the flight and ground configurations, about the rotational axis B. The geared rotatory actuator 42 is arranged to rotate the inner race 9 in both rotational directions about the axis B, so as to rotate the wing tip device 4 from the flight configuration to the ground configuration and from the ground configuration to the flight configuration.

The rotational joint 10 further comprises a locking mechanism 46 configured to selectively lock the rotation mechanism 11 such that the wing tip device 4 is locked in the flight configuration and in the ground configuration.

Referring to FIGS. 3 to 7, the locking mechanism 46 comprises a master pin 51 and a backup pin 52 that are mounted to the fixed wing 3, for reciprocal movement between extended and retracted positions. The locking mechanism further comprises first, second and third bores 53, 54, 55 provided in an arcuate flange 56 on a radially inner surface of the inner race 9, that are for receiving the pins 51, 52 so as to lock the wing tip device 4 in its ground and flight configurations.

Each of the first, second and third bores 53, 54, 55 is elongate and passes entirely through the thickness of the flange 56. Each of the bores 53-55 has a circular cross-sectional shape about its longitudinal axis and the first, second and third bores 53-55 have substantially the same diameter D (see FIGS. 8a to 9b). The bores 53-55 are open at each end to allow each pin 51, 52 to pass into one end of the bore, through the bore, and out of the other end of the bore.

The arcuate flange 56 protrudes radially inwardly from the radially inner surface of the inner race 9 and extends in the circumferential direction, part way around the rotational axis B.

Figure 10:
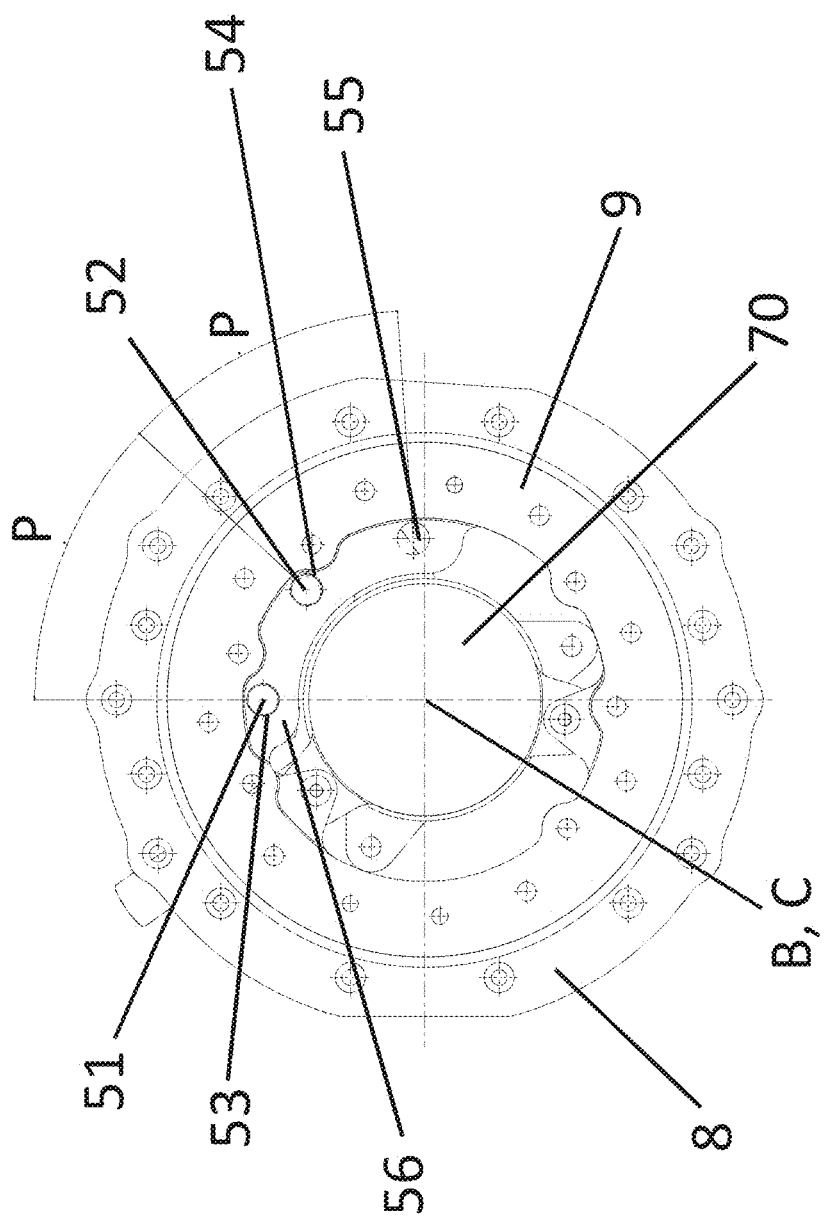
FIG. 10 shows a plan view of the rotational joint when the wing tip device is locked in the flight configuration.
Figure 11:
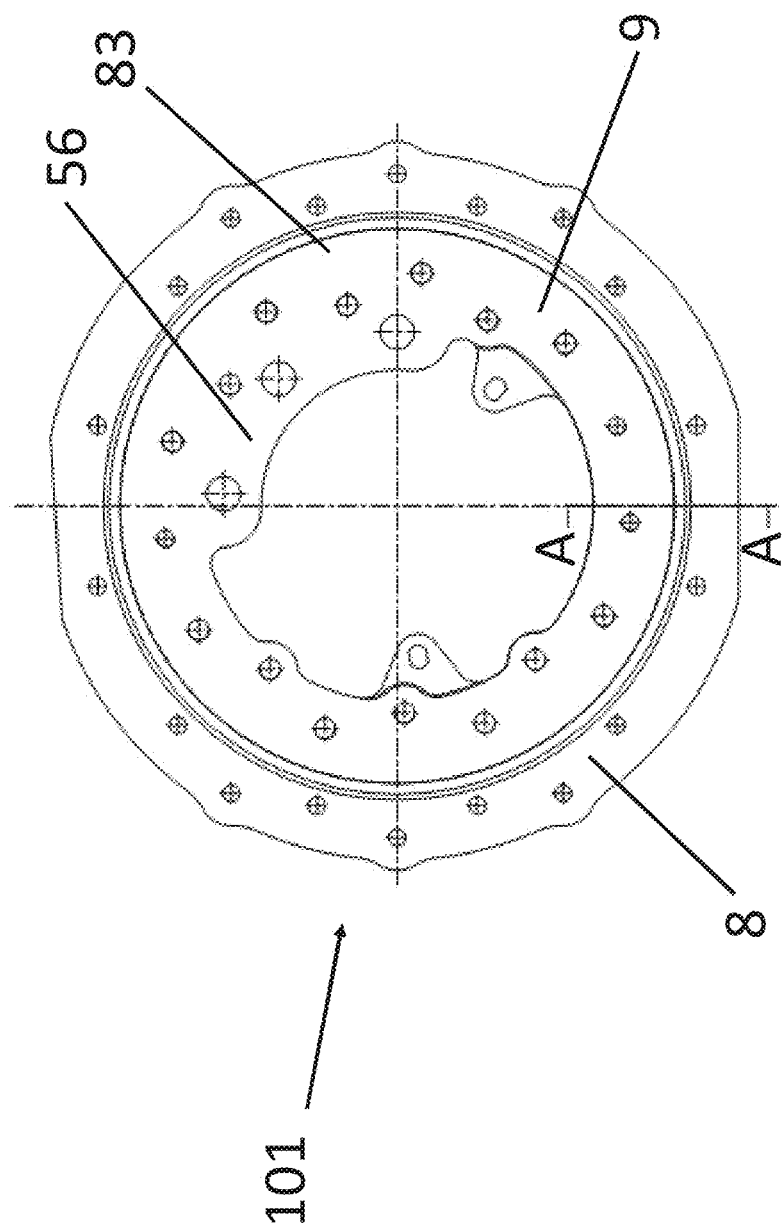
FIG. 11 shows an under plan view of a rotational joint according to a further embodiment of the invention, and where a rotational drive member has been omitted for illustrative purposes.

Referring to FIG. 10, the bores 53, 54, 55 are distributed in the circumferential direction, relative to the rotational axis B. The order of the bores in the clockwise direction, about the rotational axis B, when viewed looking from above the rotational joint 10 (as in FIGS. 4 to 7 and 10), is the first bore 53 then the second bore 54 then the third bore 55. In this regard, the second bore 54 is located between the first and third bores 53, 55, in the circumferential direction.

The bores 53-55 are equally spaced apart in the circumferential direction. In this regard, the bores 53-55 are spaced apart with a constant pitch angle P, about the rotational axis B. In this regard, as shown in FIG. 10, a constant pitch angle P is subtended between the longitudinal axes of circumferentially adjacent bores 53-55, about the rotational axis B.

The pitch angle P is equal to the angle that the wing tip device 4 rotates through, about the axis B, as it rotates from its flight configuration to its ground configuration. It is also the angle that the wing tip device 4 rotates through from its ground configuration to its flight configuration.

The flange 56 is rotationally fixed relative to the inner race 9 (it is integrally formed with the inner race 9), such that it rotates with the inner race 9. Accordingly, as the inner race 9 rotates, as the wing tip device 4 rotates between the flight configuration and the ground configuration, the inner race 9 and therefore the flange 56 is rotated about the rotational axis B of the inner race 9. This rotates the first, second and third bores 53-55 about the rotational axis B.

Since the inner race 9 is rotationally fixed relative to the wing tip device 4, such that it rotates with the wing tip device 4, as the wing tip device 4 is rotated from the flight to the ground configuration the inner race 9 rotates about the rotational axis B, anticlockwise in the orientation shown in FIGS. 4 to 7, by the pitch angle P. Similarly, as the wing tip device 4 rotates from the ground configuration to the flight configuration the inner race 9 rotates clockwise about the rotational axis B by the pitch angle P.

Since the pitch angle P is equal to the angle that the wing tip device 4 rotates through, and the bores 53-55 are spaced apart by the pitch angle P, when the wing tip device 4 is in the ground configuration, the second bore 54 is in the position that the first bore 53 was in the flight configuration and the third bore 55 is in the position that the second bore 54 was in the flight configuration (and vice versa, in the flight configuration).

Figure 6:
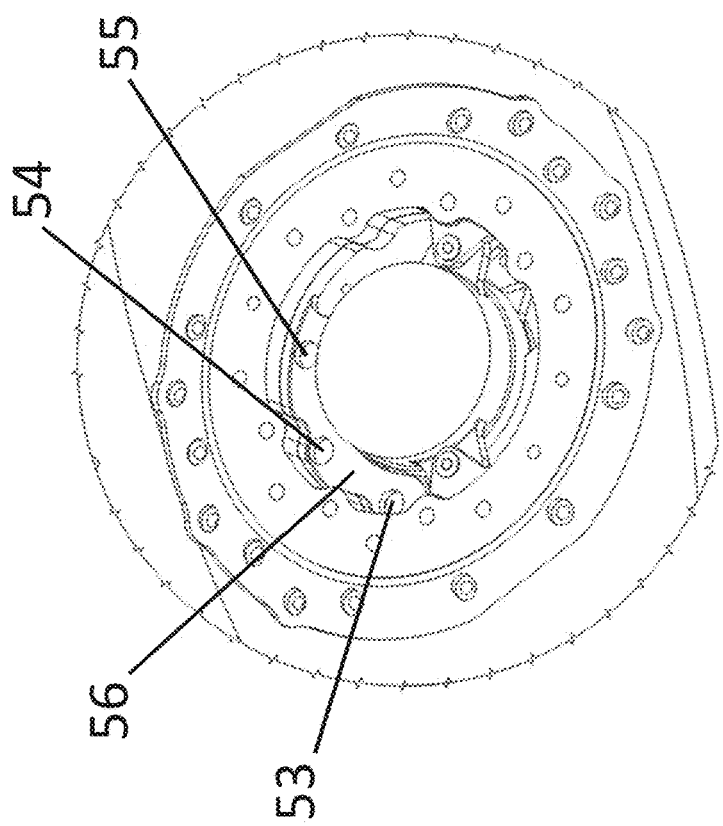
FIG. 6 is a view corresponding to that of FIG. 4, but where the wing tip device is unlocked in the ground configuration.

Each pin 51, 52 is slidably mounted in a respective cylindrical bore 47 in the outboard rib 31 of the fixed wing 3 for reciprocal movement between an extended position (as shown in FIGS. 3, 4, 7 to 9b and 10) and a retracted position (as shown in FIGS. 5 and 6).

Figure 7:
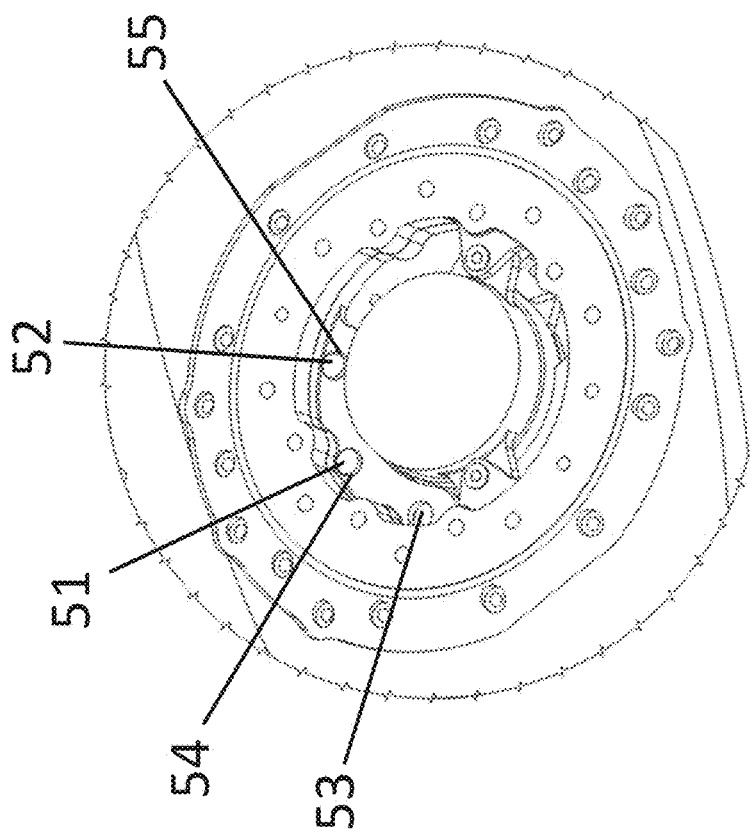
FIG. 7 is a view corresponding to that of FIG. 6, but where the wing tip device is locked in the ground configuration.

As shown in FIGS. 4 and 7, the pins 51, 52 are spaced apart in the circumferential direction, relative to the rotational axis B. The order of the pins in the clockwise direction, about the rotational axis B, when viewed looking from above the rotation mechanism 11, is the master pin 51 then backup pin 52.

The pins 51, 52 are spaced apart by the pitch angle P, i.e. by the same angle that the bores 53-55 are spaced apart. In this regard, the longitudinal axis of the backup pin 52 is spaced from the longitudinal axis of the master pin 51 in the clockwise direction, when viewed looking from above the rotation mechanism 11, by the pitch angle P.

Each pin 51, 52 is cylindrical. The master pin 51 has a diameter Ø1 and the backup pin 52 has a diameter Ø2 that is less than the diameter of the master pin 51 (see FIGS. 8a to 9b).

When each pin 51, 52 is in its extended position, the pin 51, 52 protrudes out of the open end of the cylindrical bore 47 in the fixed wing 3 and into one of the bores 53-54 in the flange 56, in dependence on the rotational position of the inner race 9 (described in more detail below). The pin 51, 52 passes all the way through the bore and out of the end of the bore such that the end of the pin 51, 52 protrudes from the bore.

When each pin 51, 52 is in its retracted position, it is located within the respective bore 47 in the fixed wing 3 such that the pin does not pass into the respective bore 53-55 in the flange 56.

Each pin 51, 52 is biased into its extended position by a coiled spring 48 that is compressed when the pin 51, 52 is in its retracted position.

For each pin 51, 52, a solenoid 57 (see FIG. 3) is arranged with the pin 51, 52 such that when the solenoid 57 is energised, it actuates the pin 51, 52 from its extended position to its retracted position. In this regard, each solenoid 57 comprises a coil 82 (shown schematically in FIG. 3) wound around an iron armature 81 that is attached to the pin. When the coil 82 is energised the magnetic field produced by the coil moves the armature 81 downwards, which overcomes the force of the spring 48 to moves the pin 51, 52 from its extended position to its retracted position.

The solenoids are energised simultaneously, so as to move the pins 51, 52 together, from their extended positions to their retracted positions. The solenoids are also de-energised simultaneously, such that the pins 51, 52 are moved together, from their retracted positions to their extended positions, by the springs 48. Any suitable type of actuator may be used in place of the solenoids, such as a hydraulic actuator, for example.

By virtue of their mounting in the fixed wing 3, the master and backup pins 51, 52 are rotationally fixed relative to the fixed wing 3. Accordingly, as the first, second and third bores 53-55 rotate about the rotational axis B, they are rotated relative to the pins 51, 52, as will now be described in more detail.

Referring to FIGS. 4 and 5, the rotation mechanism 11 is shown in a rotational position in which the wing tip device 4 is in the flight configuration. In FIG. 4 the wing tip device 4 is locked in the flight configuration and in FIG. 5 the wing tip device 4 is unlocked in the flight configuration.

In the flight configuration the inner race 9 is rotatably positioned, about the rotation axis B, such that the first and second bores 53, 54 are aligned (in the circumferential and radial directions) with the master and backup pins 51, 52 respectively.

When the wing tip device 4 is locked in the flight configuration (see FIG. 4), the solenoids 57 are de-energised such that the master and backup pins 51, 52 are received in the first and second bores 53, 54 respectively, due to the biasing force exerted on the pins 51. 52 by the springs 48.

The receipt of the pins 51, 52 in the bores 53, 54 rotatably fixes the inner race 9 relative to the fixed wing 3. Since the outer race 8 is rotationally fixed relative to the fixed wing 3, this rotationally fixes the inner race 9 relative to the outer race 8, i.e. it rotatably locks the rotation mechanism 11.

The fixing of the inner race 9 in this rotational position rotationally fixes the fixed wing device 4 in the flight configuration, i.e. it locks the fixed wing device 4 in the flight configuration.

In order to rotate the wing tip device 4 from the flight configuration to the ground configuration, firstly the wing tip device 4 is unlocked from the flight configuration by energising the solenoids 57 simultaneously, so as to move the pins 51, 52 together, from their extended positions to their retracted positions.

When each pin 51, 52 is in its retracted position, it is no longer received in the respective bore 53, 54, as shown in FIG. 5. This allows the inner race 9 to rotate, thereby unlocking the wing tip device 4 and allowing it to rotate from the flight configuration to the ground configuration.

In order to rotate the wing tip device 4 from the flight configuration to the ground configuration, the rotary actuator 42 is operated to rotate the inner race 9 anticlockwise (when viewed from above the rotational mechanism 11, shown in FIGS. 4 and 5) about the rotational axis B by the pitch angle P.

Accordingly when the wing tip device 4 is in the ground configuration, the second bore 54 is located in the position that the first bore 53 was in when the wing tip device was in the flight configuration and the third bore 55 is in the position that the second bore 54 was in the flight configuration. In this position, the second bore 54 is aligned (radially and circumferentially) with the retracted master pin 51 and the third bore 55 is aligned with the retracted backup pin 52 (as shown in FIG. 6).

The solenoids 57 are then de-energised such that the master pin 51 is received in the second bore 54 and the backup pin 52 is received in the third bore 55 (see FIG. 7).

The receipt of the pins 51, 52 in the bores 54, 55 rotatably fixes the inner race 9 relative to the fixed wing 3, i.e. it rotatably locks the rotation mechanism 11.

The fixing of the inner race 9 in this rotational position rotationally fixes the fixed wing device 4 in the ground configuration, i.e. it locks the fixed wing device 4 in the ground configuration.

In order to rotate the wing tip device 4 back from the ground configuration to the flight configuration, the above described process is repeated in reverse, i.e. the solenoids 57 are energised so as to move the master and backup pins 51, 52 to their retracted positions, the rotary actuator rotates the inner race 9, and therefore the wing tip device 4, in the clockwise direction about the axis B, such that the inner race 9 is in the position shown in FIGS. 4 and 5, and the solenoids 57 are de-energised such that the springs 48 move the master and backup pins 51, 52 into the first and second bores 53, 54 respectively, to lock the wing tip device 4 in the flight configuration.

The locking of the fixed wing device 4 and the load transfer function of the rotation mechanism 11, will now be described with reference to FIGS. 8a to 9b.

The aircraft 2 is arranged such that substantially all the aerodynamic and inertial loads on the wing tip device 4 during use of the aircraft, are transferred to the fixed wing 3, via the rotational joint 10.

FIG. 8a shows a cross-sectional view (taken along the diameter of the master pin 51) of the master pin 51, and of the region of the flange 56 that defines the first bore 53, when the wing tip device 4 is locked in the flight configuration. FIG. 8b shows a cross-sectional view (taken along the diameter of the backup pin 52) of the backup pin 52, and of the region of the flange 56 that defines the second bore 54, when the wing tip device 4 is locked in the flight configuration.

Figure 9A:
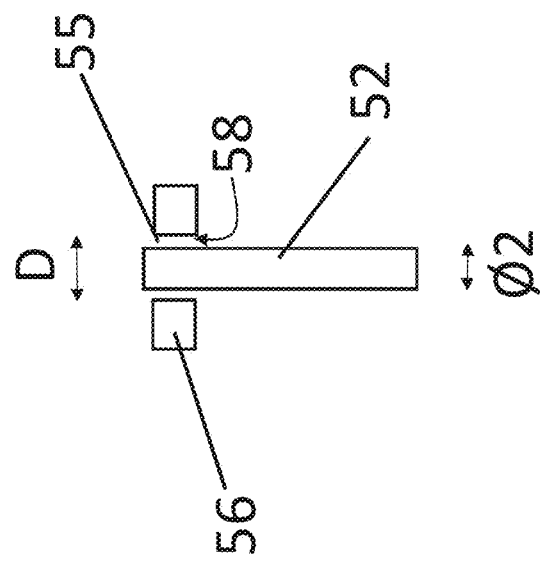
FIGS. 9a and 9b show a cross-sectional view of the master and back-up pins in second and third apertures respectively, when the wing tip device is locked in the ground configuration.
Figure 9B:
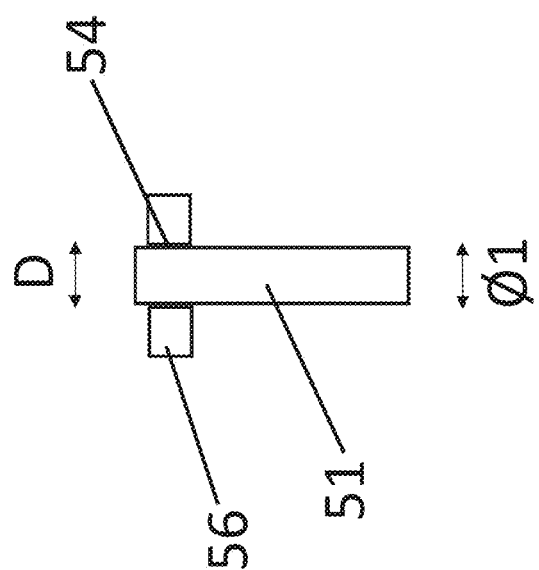

FIG. 9a shows a cross-sectional view (taken along the diameter of the master pin 51) of the master pin 51, and of the region of the flange 56 that defines the second bore 54, when the wing tip device 4 is locked in the ground configuration. FIG. 9b shows a cross-sectional view (taken along the diameter of the backup pin 52) of the backup pin 52, and of the region of the flange 56 that defines the third bore 55, when the wing tip device 4 is locked in the ground configuration.

The diameter Ø1 of the master pin 51 closely matches the diameter D of the first and second bores 53, 54, such that when the master pin is received in the first or second bores 53, 54 (in the flight and ground configurations respectively), it forms a close-fit within the bore 53, 54.

The diameter Ø2 of the backup pin 52 is less than the diameter D of the second and third bores 54, 55, such that when the backup pin is received in the second or third bores 54, 55 (in the flight and ground configurations respectively), a radial clearance 58 is provided between the radially outer surface of the pin 52 and the internal surface of the flange 56 that defines the bore 54, 55.

The close-fit of the master pin 51 in the respective bores 53, 54 (in the flight and ground configurations) and the clearance between the backup pin 52 and the surfaces that define the respective bores 54, 55 (in the flight and ground configurations) are such that the master pin 51 transfers loads on the wing tip device 4, during use in both the flight and ground configurations, to the fixed wing 3 and the backup pin 52 only transfers loads on the wing tip device 4 to the fixed wing 3 if there is structural failure of the master pin 51.

The loads on the wing tip device 4 may be aerodynamic and/or inertial loads during use of the aircraft 2.

Structural failure of the master pin 51 includes when the master pin starts to structurally fail, as well as when it has structurally failed.

Each of the pins 51, 52 are shear pins designed to structurally fail, by shearing, when a load greater than or equal to a pre-determined maximum load is applied to the pin. This is so as to prevent damage to the inner race 9, fixed wing 3 or wing tip device 4 in the event that a load exceeding this maximum is exerted on the wing tip device 4.

In terms of the locking function of the pins 51, 52, described above, when the wing tip device 4 is in the flight configuration, the inner race 9 is rotationally fixed due to the receipt of the master pin 51 in the first bore 53 and the receipt of the backup pin 52 in the second bore 54. The close-fit of the master pin 51 in the first bore 51 prevents the inner race 9 from rotating relative to the fixed wing 3. This is due to the abutment of the inner surface of the flange 56 that defines the first bore 51 against the external surface of the master pin 51. It will be appreciated that the backup pin 52 also 'locks' the inner race 9 relative to the fixed wing 3 since, if the master pin 51 was not present, or if it fails, then the backup pin 52 substantially rotationally fixes the inner race 9 relative to the fixed wing 3. In this regard, even though there may be a small amount of relative rotation possible due to the clearance 58 within the respective bore, substantial relative rotation is prevented. Therefore, both the master and backup pins 51, 52 act to lock the fixed wing device 4 in both the flight and ground configurations.

As can be seen from the above description of the locking mechanism 46, the second bore 54 receives a pin 51, 52 when the wing tip device 4 is locked in both the flight configuration and the ground configuration. In this regard, when the wing tip device 4 is locked in the flight configuration, the second bore 54 receives the backup pin 52 and when the wing tip device 4 is locked in the ground configuration, the second bore 54 receives the master pin 51.

Therefore, the second bore 54 has a dual function. In the flight configuration the second bore 54 acts, with the backup pin 52, to provide a back-up load path if the master pin 51 fails and in the ground configuration the second bore 54 acts, with the master pin 51, to provide the primary load path, to transfer loads from the wing tip device 4 to the fixed wing 3.

This dual function of the second bore 54 may be advantageous in that it reduces the number of bores that would otherwise be necessary. This may reduce the overall size, complexity and weight of the rotational joint 10. This is especially advantageous with folding wing tip devices since the wing tends to have limited volume in the vicinity of the rotational joint between the fixed and folded parts of the wing. In order to accommodate essential internal structure (e.g. ribs, spars or other support structure), and/or aircraft systems (e.g. actuators) within the wing, it may be necessary to redesign the internal layout of the wing, locally increase the wing volume in the vicinity of the rotational joint, and/or significantly constrain the possible location of the rotational joint. A reduction in the overall size, complexity and weight of the rotational joint 10 may minimise the extent of such changes, thereby allowing a more optimal overall design.

Referring to FIGS. 11 to 21c, there is shown a rotational joint 101 according to a further embodiment of the invention. The rotational joint 101 is used in place of the rotational joint 10 in the above described embodiment, to rotatably couple the wing tip device 4 to the fixed wing 3, such that the wing tip device 4 is rotatable between the flight and ground configurations.

In an aircraft wing 2 according to a further embodiment of the invention, the rotational joint 101 is used in place of the rotational joint 10. The rotational joint 101 and the aircraft wing 2 comprising the rotational joint are the same as those described in the embodiment above, apart from the differences described below. Corresponding features are given corresponding reference numerals.

For the rotational joint 101, the inner race 9 comprises a female member 72 and the outer race 8 comprises a male member 76 that is received in the female member 72 such that the inner race 9 is axially and radially retained relative to the outer race 8.

Figure 12:
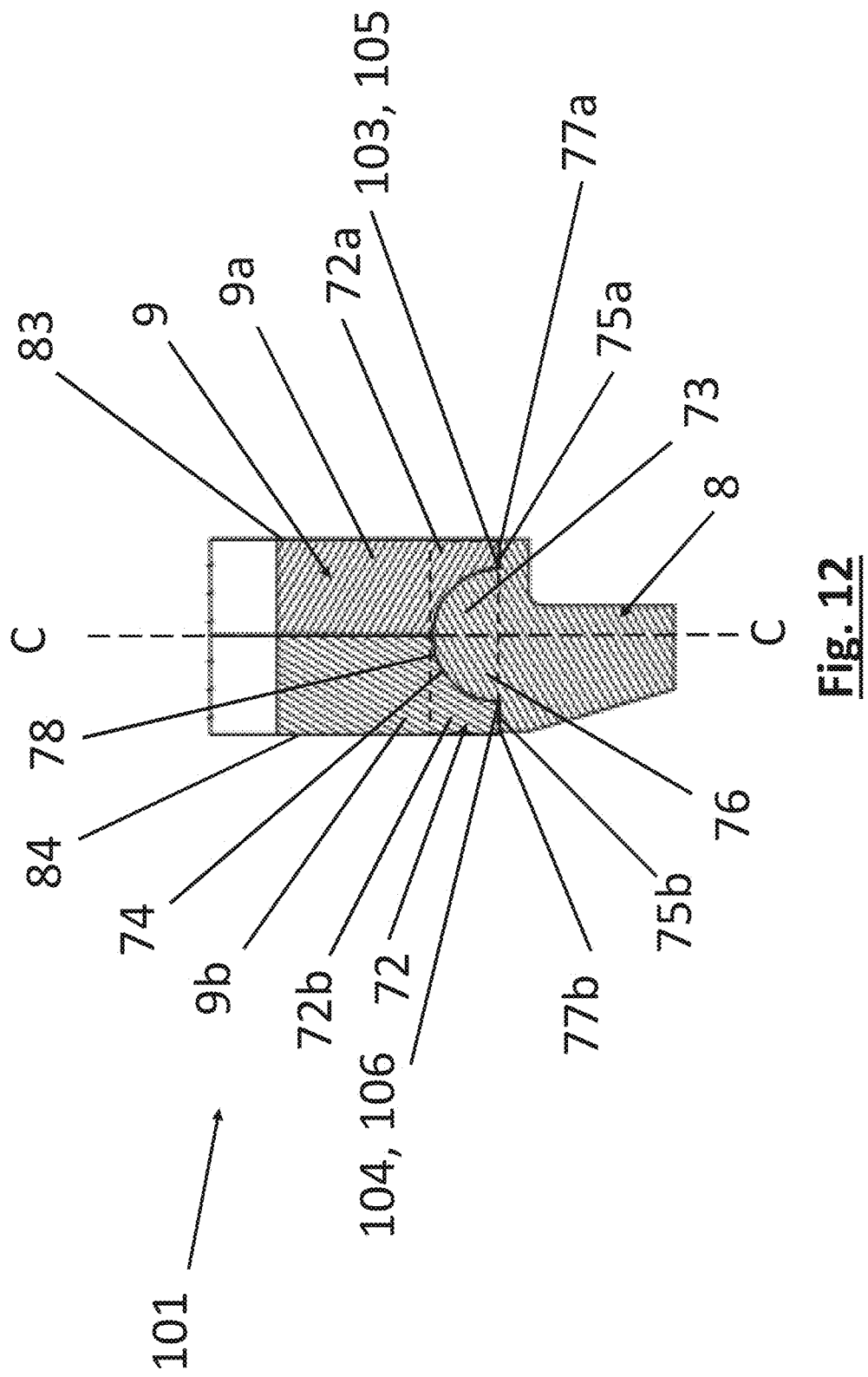
FIG. 12 shows an enlarged cross-sectional view taken along the line A-A in FIG. 11.

In more detail, a radially outermost section of the inner race 9 forms the female member 72. The cross sectional shape of the female member 72 (in a radial plane) is shown in FIG. 12 as the area of the inner race 9 enclosed by the dashed rectangle 72. The female member 72 extends, in the circumferential direction, around the entire circumference of the inner race 9. The cross-sectional shape of the female member 72 is substantially constant around the circumference of the inner race 9.

The radially outer periphery of the inner race 9 is provided with a circumferentially and radially inwardly extending recess 73 that has a concave semi-circular cross-sectional shape.

The recess 73 is defined by an internal face 74 of the inner race 9 that curves, with a semi-circular cross-sectional shape, between upper and lower circumferentially extending edges 103, 104. The semi-circular cross-sectional shape of the internal face 74 is centred half way along the axial length (thickness) of the inner race 9 and in line with the radially outer periphery of the inner race 9. The internal surface 74, and therefore the recess 73 has a constant cross-sectional shape around the circumference of the inner race 9.

The diameter of the semi-circular cross-sectional shape of the internal face 74 is less than the axial length of the inner race 9 such that the upper and lower edges 103, 104 are located below and above the upper and lower radial faces 83, 84 of the inner race 9 respectively. The upper and lower edges 103, 104 are each located at the radially outer periphery of the inner race 9 and are radially aligned with each other.

The upper and lower edges 103, 104 are connected to the upper and lower radial faces 83, 84 of the inner race 9 respectively by upper and lower sections 75a, 75b of the radially outer periphery of the inner race 9. The upper and lower sections 75a, 75b have a substantially constant radius across their axial length.

As shown in FIG. 12, the female member 72 includes the circumferentially extending sections of the radially inner race 9 on either axial side of the recess 73 (i.e. between the internal surface 74 and the respective upper or lower radial face 83, 84 of the inner race), that are located within the radial extent of the recess 73.

The male member 76 extends along the circumference of the radially inner periphery of the outer race 8 and protrudes radially outwardly from the radially inner periphery.

The male member 76 has an external face 78 that curves, with a semi-circular cross-sectional shape, between upper and lower circumferentially extending sides 105, 106. The semi-circular cross-sectional shape of the external face 78 is substantially concentric with the centre of the cross-sectional shape of the internal surface 74. The external face 78 has a constant cross-sectional shape around the circumference of the outer race 8.

The diameter of the cross-sectional shape of the external face 78 is less than the axial length of the outer race 8 such that the upper and lower sides 105, 106 are located below and above the upper and lower radial faces of the outer race 8 respectively. The upper and lower sides 105, 106 are each located at the radially inner periphery of the outer race 8 and are radially aligned with each other.

The upper and lower edges 105, 106 are connected to the upper and lower radial faces of the outer race 8 respectively by upper and lower sections 77a, 77b of the radially inner periphery of the outer race 8. The upper and lower sections 77a, 77b have a substantially constant radius across their axial length.

When the male member 76 is received in the female member 72, the internal face 74 of the female member 72 axially overlaps the external face 78 of the male member 76. This acts to radially retain the inner race 9 relative to the outer race 8. Furthermore, it will be appreciated that this axial overlap occurs on diametrically opposed sides of the male member, which acts to radially retain the inner race 9 relative to the outer race 8 in opposite radial directions.

In addition, the internal face 74 of the female member 72 radially overlaps the male member 76 on opposite axial sides of the male member 76. This acts to axially retain the inner race 9 relative to the outer race 8 in opposite axial directions.

Furthermore, the external face 78 of the male member 76 has a complementary shape to that of the internal surface 74 of the female member 72. In this regard, the male member 76 has a complementary shape to that of the recess 73.

The external face 78 of the male member 76 and the internal face 74 of the female member 72 are in contact with each other along their entire surface areas. The external face 78 of the male member 76 forms a close radial and axial fit with the internal face 74 of the female member 72. In this regard, the male member 76 forms a zero clearance fit with the female member 72.

Accordingly, due to the receipt of the male member 76 in the female member 72, the inner race 9 is axially and radially fixed relative to the outer race 8. In this respect, movement of the inner and outer races 9, 8 relative to each other, in the axial and radial directions, is substantially prevented by the abutment of said faces 74, 78 of the male and female members 76, 72.

In addition, the upper and lower sections 75a, 75b of the radially outer periphery of the inner race 9 are in abutment with the upper and lower sections 77a, 77b of the radially inner periphery of the outer race 8 respectively. In this regard, the inner race 9 forms a close radial fit with the outer race 8. This also acts to radially fix the inner race 9 relative to the outer race 8.

As described above, when the wing tip device 4 rotates between the flight and ground configurations, the inner race 9 rotates relative to the outer race 8. The engagement of the male member 76 in the female member 72 allows for and guides the relative rotation of the inner and outer races 9, 8.

In this regard, as the inner race 9 rotates about the rotational axis B, the external face 78 of the male member 76 bears against the internal face 74 of the female member which, as described above, acts to axially and radially retain the inner race 9 relative to the outer race 9 and therefore acts to guide the relative rotation of the inner and outer races 9, 8.

Figure 13:
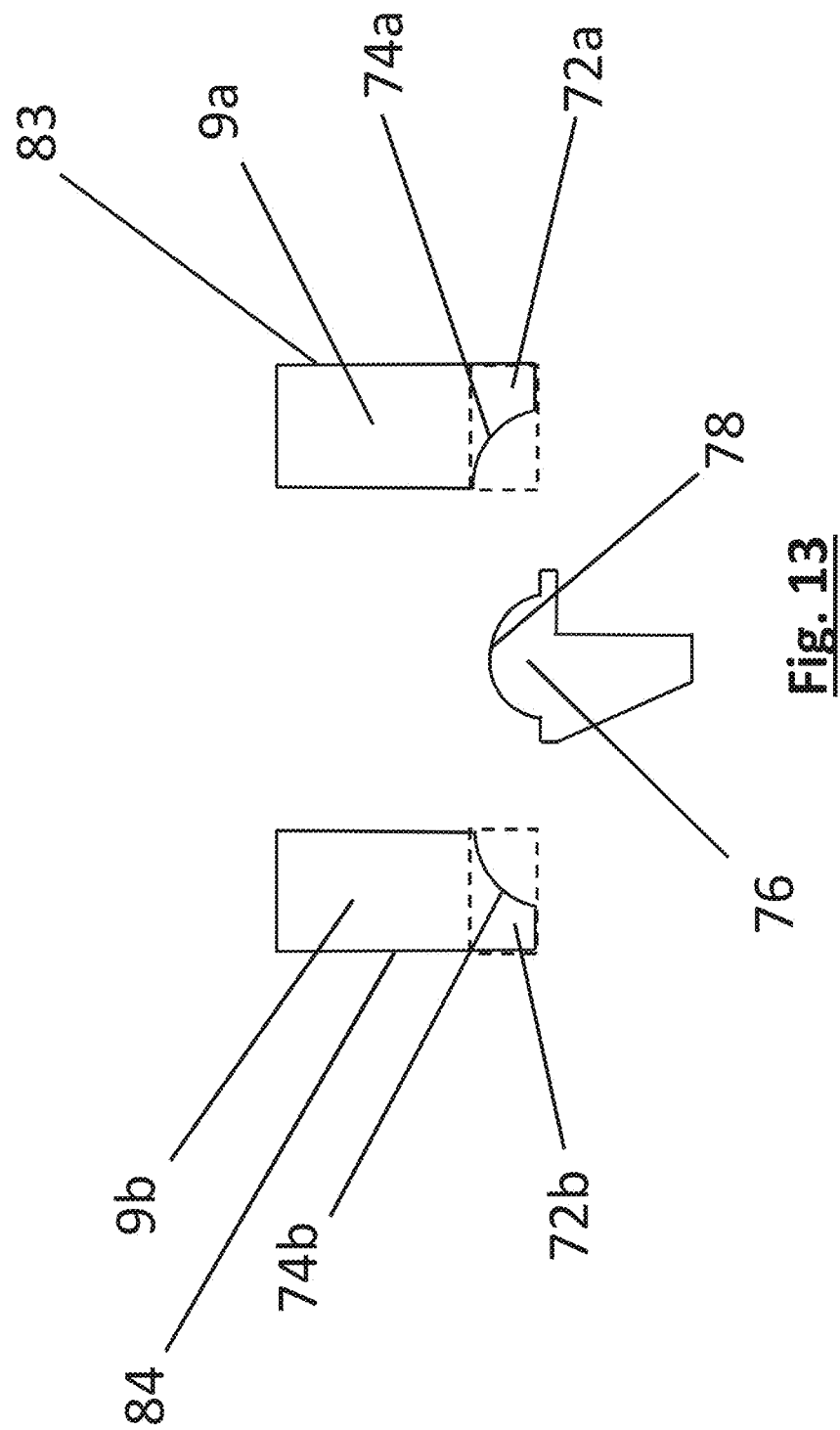
FIG. 13 shows a view corresponding to that of FIG. 12 but where the female member of the rotational joint is shown in an unassembled position.

Referring to FIGS. 12 and 13, the inner race 9 is a two part assembly comprising first and second parts 9a, 9b that together form the female member 72. In this regard, the inner race 9 is split into the first and second parts 9a, 9b along a radial plane C (i.e. a plane parallel to the radial direction) that is perpendicular to the rotational axis B and located midway along the axial length of the inner race 9. Accordingly the first and second parts 9a, 9b are first and second axial halves of the inner race 9. It will be appreciated that each of the first and second parts 9a, 9b is itself a ring that extends completely around the rotational axis B.

The first and second parts 9a, 9b each form a respective axial half 72a, 72b of the female member 72. In this regard, each axial half 72a, 72b of the female member 72 is formed by the circumferentially extending sections of each of the first and second parts 9a, 9b, between the respective internal surface 74a, 74b and the respective upper or lower radial face 83, 84, that are located within the radial extent of the internal surface 74a, 74b.

The internal face 74 of the female member 72 is formed by internal surfaces 74a, 74b (see FIG. 13) of the first and second parts 9a, 9b, which each form a respective axial half of the internal face 74.

A method of assembly of the rotational joint 101, according to an embodiment of the invention, will now be described.

As stated above, the inner race 9 is a two part assembly. In this regard, the first and second parts 9a, 9b are formed separately to each other.

In order to assemble the rotational joint 101, the first and second parts 9a, 9b are brought together from an unassembled configuration (shown in FIG. 13) to an assembled configuration (shown in FIG. 12).

In the unassembled configuration the first and second parts 9a, 9b are axially spaced from each other. The first and second parts 9a, 9b are not fixed relative to each other.

To assemble the rotational joint 101, the first and second parts 9a, 9b are radially aligned with each other and are each inserted through opposite axial ends of the outer race 8.

The first and second parts 9a, 9b are then brought together, from opposite axial sides of the male member 76, to form the female member 72 about the male member 76 such that the male member 76 is received in the female member, as shown in FIG. 12.

In this regard, as the first and second parts 9a, 9b are brought together, the internal surfaces 74a, 74b of each axial half 72a, 72b of the female member 72 are brought together to form the female member 72 around the male member 76. In the assembled configuration, the first and second parts 9a, 9b of the inner race 9 are in contact with each other along the radial split plane C.

The first and second parts 9a, 9b are then fixed to each other (axially and radially) by a plurality of fasteners that pass through the first and second parts 9a, 9b and attach the first and second parts 9a, 9b to the wing tip device 4 (these bolts correspond to the nuts and bolts 35, 36 in the embodiment shown in FIG. 3). This attaches the upper and lower lugs 110, 111 to each other (see below).

As described above with reference to FIG. 12, when the first and second parts 9a, 9b are in the assembled configuration, the external face 78 of the male member 76 forms a close radial and axial fit with the internal face 74 of the female member 72. In this regard, the male member 76 forms a zero clearance fit with the female member 72.

Accordingly, due to the receipt of the male member 76 in the female member 72, and due to the fixing of the first and second parts 9a, 9b to each other, the inner race 9 is axially and radially fixed relative to the outer race 8.

In addition, the upper and lower sections 75a, 75b of the radially outer periphery of the inner race 9 are in abutment with the upper and lower sections 77a, 77b of the radially inner periphery of the outer race 8 respectively. In this regard, the inner race 9 forms a close radial fit with the outer race 8. This also acts to radially fix the inner race 9 relative to the outer race 8.

A method of assembling an aircraft wing 1 comprises rotatably coupling the wing tip device 4 to the fixed wing 3 by the rotational joint 101. In this regard, the inner race 9 is attached to the wing tip device 4 by said nuts and bolts 36, 35, and the outer race 8 is attached to the fixed wing 3 by said nuts and bolts 33, 32, as described in relation to FIG. 3. It will be appreciated that any suitable means of attachment may be used.

The inner race 9 may be attached to the wing tip device 4 and/or the outer race 8 attached to the fixed wing 3 before the rotational joint 101 is assembled. Alternatively, the rotational joint 101 may be assembled before the inner race 9 is attached to the wing tip device 4 and/or the outer race 8 is attached to the fixed wing 3.

A method of assembling an aircraft 2, comprises assembling a wing 1 (or a pair of wings) according to the above described method of assembly of an aircraft wing and attaching the wing 1 to an aircraft fuselage.

It will be appreciated that the rotational joint 101 rotatably couples the wing tip device 4 to the fixed wing 3 such that the wing tip device 4 is rotatable relative to the fixed wing 3 between the flight and ground configurations. In addition, the rotational joint is configured to transmit axial and radial loads exerted on the wing tip device 4 to the fixed wing 3, during use. In this regard, because the engagement of the male member 76 in the female member 72 acts to axially and radially retain the inner race 9 relative to the outer race 8, this acts to transmit axial and radial forces exerted on the wing tip device 4 to the fixed wing 3, during use.

Assembling the female member 72 from two-parts 72a, 72b enables the female member to be assembled about the male member 76. It may otherwise be difficult or impossible to receive the male member 76 in the female member 72, as the inner race 9 is received in the outer race 8, since the male and female members 76, 72 are configured such that when the male member 76 is received in the female member 76, the inner race 9 is axially and radially retained relative to the outer race 8.

In this regard, as the first and second parts of the inner race 9a, 9b are brought together, they form a close-radial fit with the outer race 8. Accordingly, the first and second parts 9a, 9b are radially retained relative to the outer race 8, and to each other, as they are brought together. Furthermore, as the first and second parts are brought together, the male member 76 radially overlaps the first and second parts 72a, 72b of the female member 72.

In addition, when the male member 76 is received in the female member 72, said radial retention is such that radial movement of the inner race 9 relative to the outer race 8, to an extent that allows the male member 76 to be radially removed from the female member 72 (i.e. when the female member is assembled from said first and second parts 9a, 9b) is prevented.

Accordingly, if the inner race 9 was made from a single piece, inserted through one end of the outer race 8, the male and female members 76, 72 may otherwise clash, as the inner race 9 is moved along the outer race 8, such that the male member is prevented from being received in the female member. Therefore the method of assembly of the rotational joint according to the present invention may allow, or facilitate, the assembly of the rotational joint 101 and therefore of a wing 1 comprising the rotational joint and of an aircraft 2 comprising the wing.

Referring to FIGS. 14 to 21c, the coupling of the drive shaft 70 to the inner race 9, by the pair of lug joints 71, will now be described in more detail.

Each of the lug joints 71 is identical and so it will be appreciated that a description of features of one of the lug joints 71 applies to the other.

In relation to each lug joint 71, the inner race 9 comprises first and second lugs 110, 111 that are spaced apart in the axial direction B. The lugs 110, 111 are attached to the first and second parts 9a, 9b of the inner race 9 respectively.

It will be appreciated that, unless otherwise stated, references to axial, radial and circumferential directions are in relation to the rotational axis B of the inner race 9. Furthermore, it will be appreciated that, unless otherwise stated, references to something moving or extending in a specific direction (e.g. axial, radial or circumferential) does not require that the movement or extension is parallel to that direction and only requires that it has at least a component in that direction.

In the orientation of the rotational joint shown in FIGS. 14 to 21c, the first lug 110 forms an upper lug and the second lug 111 forms a lower lug. The upper and lower lugs 110, 111 are substantially identical. It will be appreciated that a description of features of one of the lugs 110, 111 applies to the other. It will also be appreciated that the invention is not limited to the orientation of the rotational joint shown and may include different orientations.

Each lug 110, 111 is mounted on the radially inner periphery of the inner race 9 and protrudes radially inwardly from the radially inner periphery.

Figure 16:
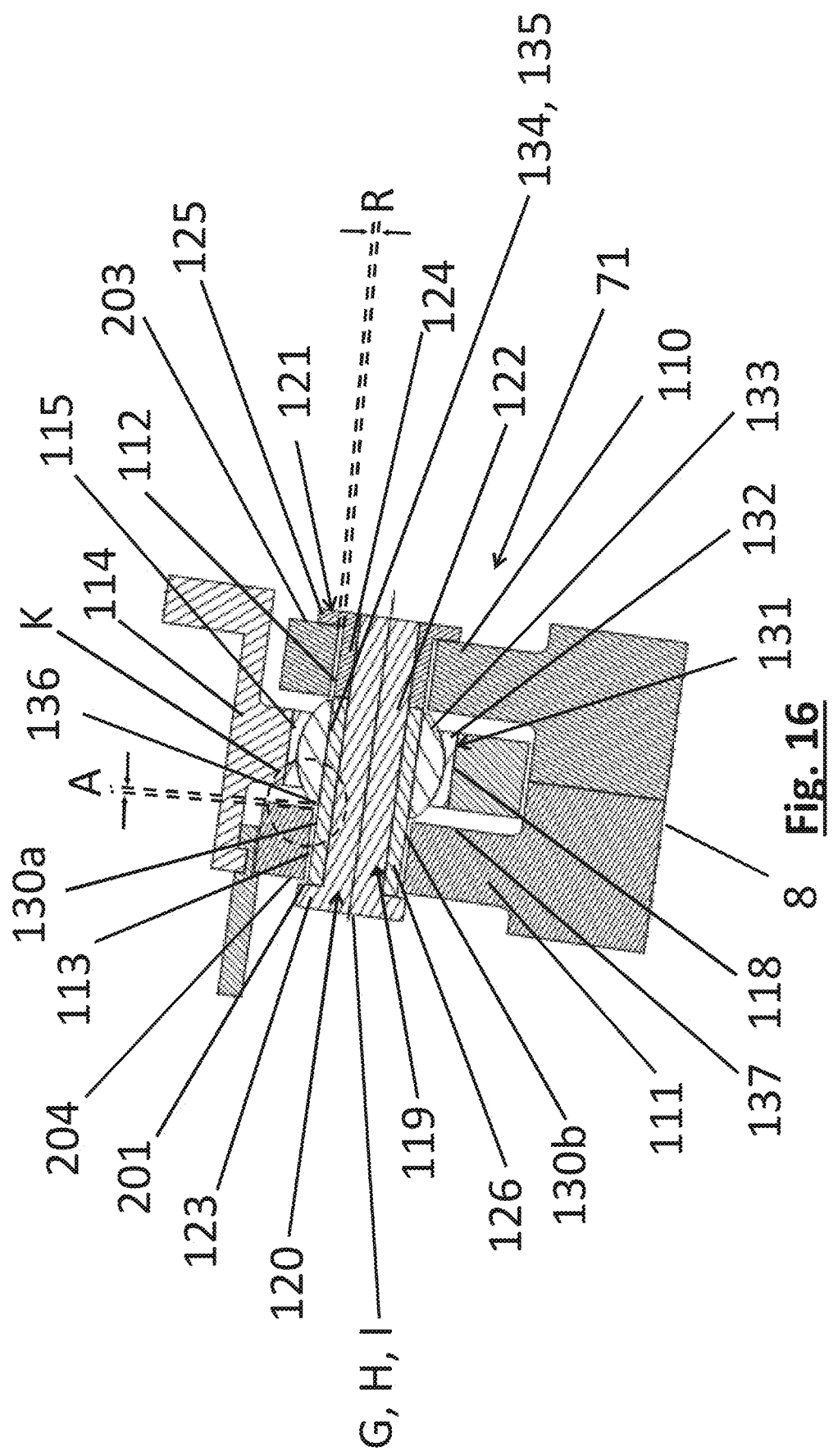
FIG. 16 shows a cross-sectional view taken along the line D-D in FIG. 15.

A bore 112, 113 is provided in each lug 110, 111 and passes all the way through the thickness of the lug 110, 111 in the axial direction (best shown in FIG. 16). Each bore 112, 113 has a central longitudinal axis G.

Each bore 112, 113 is defined by a respective inner surfaces of the lug 110, 111. For each bore 112, 113, the inner surfaces that define the bore 112, 113 comprise a pair of opposed surfaces 116a, 116b that are spaced apart in the circumferential direction (see FIG. 19). Each of these sides 116, 116b is substantially planar and substantially parallel to the local radial direction (the local radial direction at the longitudinal axis G of the bore 112, 113). In this regard, each of these sides 116, 116b is substantially perpendicular to the local circumferential direction (the local circumferential direction at the longitudinal axis G of the bore 112, 113).

The inner surfaces that define the bore 112, 113 also comprise a pair of opposed surfaces 117a, 117b that are spaced apart in the radial direction. Each of these surfaces 117a, 117b is concavely curved, about the longitudinal axis G of the respective bore 112, 113, and joins a pair of radially inner or outer sides of the surfaces 116a, 116b respectively. Each of the surfaces 117a, 117b has a substantially constant cross-sectional shape along its axial length.

It will be appreciated the each bore 112, 113 has a corresponding shape to that of the internal surfaces that define the bore 112, 113.

In relation to each lug joint 71, the drive shaft 70 comprises a lug 114 mounted on the radially outer periphery of the drive shaft 70 and that protrudes radially outwardly from the radially outer periphery.

A cylindrical bore 115 is provided in the lug 114 and passes through the thickness of the lug 114, in the axial direction. The cylindrical bore 115 is defined by a cylindrical internal surface 118 of the lug 114 and has a central longitudinal axis H. In the described embodiment, when the rotational axes B, C of the inner and outer races 9, 8 and the drive shaft 70 are co-axial, the longitudinal axes G, H of the bores in the lugs 111, 112 of the inner race 9 and of the bore 115 in the lug 114 of the drive shaft 70 are substantially co-axial.

A coupling member 119 passes through each of the bores 112, 113, 115 in the lugs 110, 111 of the inner race 9 and the lug 114 of the drive shaft 70. The coupling member 119 comprises a bolt 120 and a bush 121 threaded onto an end of the bolt 120. The coupling member 119 has a central longitudinal axis I (see FIG. 16).

The bolt 120 comprises a solid cylindrical shaft 122, that is co-axial with the longitudinal axis I, and has an enlarged circular head 123 provided at one end of the shaft 122, axially outboard of (i.e. below) and adjacent to the lower lug 111. The shaft 122 has a substantially constant radius along its length and the head 123 has a radius that is greater than that of the shaft 122 such that it protrudes radially outwardly of the shaft 122. The head 123 also has a greater radius than the bore 113 in the lower lug 111.

The bush 121 comprises a hollow stem 124 that is co-axial with the longitudinal axis I and has an enlarged circular head 125 provided at one end of the stem 124, axially outboard of (i.e. above) and adjacent to the upper lug 110.

The head 125 has a greater radius than the stem 124 such that it protrudes radially outwardly of the stem 124. The head 125 also has a greater radius than the bore 112 in the upper lug 110.

The stem 124 has a similar external shape to that of the inner surfaces of the upper and lug 110 that defines the bores 112. In this regard, the stem 124 comprises a pair of radially outer surfaces 127a, 127b (radially outer relative to the longitudinal axis I of the coupling member 119) that are spaced apart in the local circumferential direction. Each of these surfaces 127a, 127b is substantially planar and substantially parallel to the local radial direction (the radial direction at the longitudinal axis G of the bore 112), i.e. substantially perpendicular to the local circumferential direction.

The bush stem 124 forms a close-fit in the circumferential direction with the inner surfaces of the upper lug 110 that define the bore 112, with the surfaces 127a, 127b of the bush stem 124 in contact with the surfaces 116a, 116b of the bore 112.

The stem 124 also has a pair of radially outer surfaces 128a, 128b that are spaced apart in the radial direction. Each of these surfaces 128a, 128b is concavely curved, about the longitudinal axis I of the coupling member 119 and has a substantially constant cross-sectional shape along its axial length. Each of the surfaces 128a, 128b joins a pair of radially inner or outer sides of the surfaces 127a, 127b respectively.

Each of these surfaces 128a, 128b has a radius of curvature that is substantially the same as that of the adjacent curved inner surface 117a, 117b of the bore 112. However, the radially extending surfaces 127a, 127b of the bush stem 124 have a shorter radial length than that of the surfaces 116a, 116b of the bore 112 they are in contact with.

In this respect, a radial clearance 'R' is provided between each curved surface 128a, 128b of the bush stem 124 and the opposed curved surfaces 117a, 117b of the bore 112. This radial clearance R is substantially constant along the axial length of the bush stem 124.

An end section of the shaft 122 of the bolt 120 that is opposite to the head 123 is threaded and radially inner surfaces of the stem 124 and head 125 of the bush 121 are provided with a complimentary threaded section such that the bush 121 forms a screw fit attachment on the end of the bolt shaft 122. In this regard, the bush 121 is releasably attachable to the bolt 120.

A spacer, in the form of a hollow sleeve 126 is mounted on the bolt shaft 122. The radially inner surface of the sleeve 126 (radially inner relative to the longitudinal axis I of the coupling member 119) is cylindrical and forms a close-fit with the external cylindrical surface of the bolt shaft 122.

Figure 14:
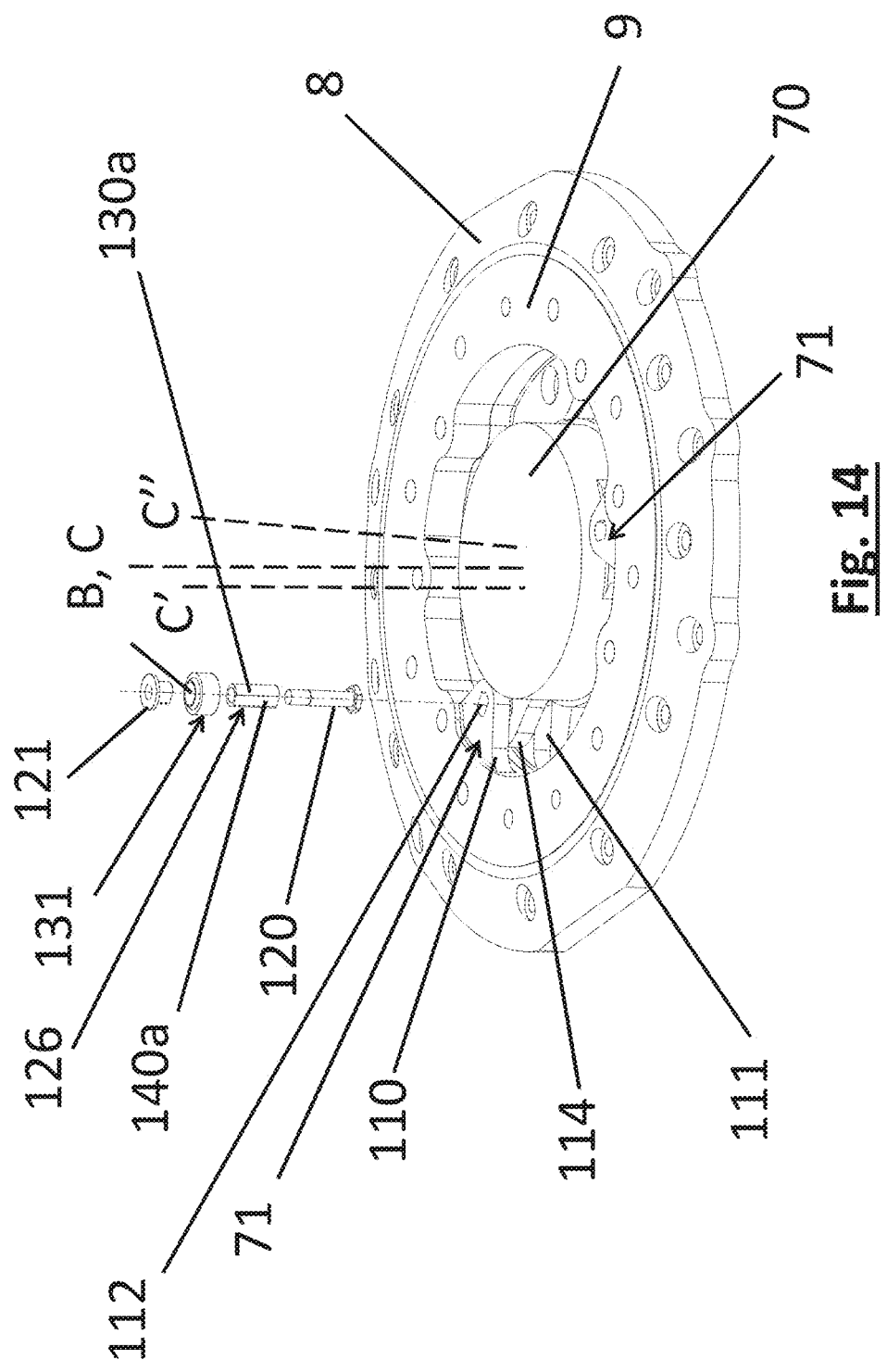
FIG. 14 shows a perspective view of the rotational joint shown in FIG. 11, but including the rotational drive member, and where a coupling member, spacer and bearing assembly are shown in an exploded view for illustrative purposes.
Figure 15:
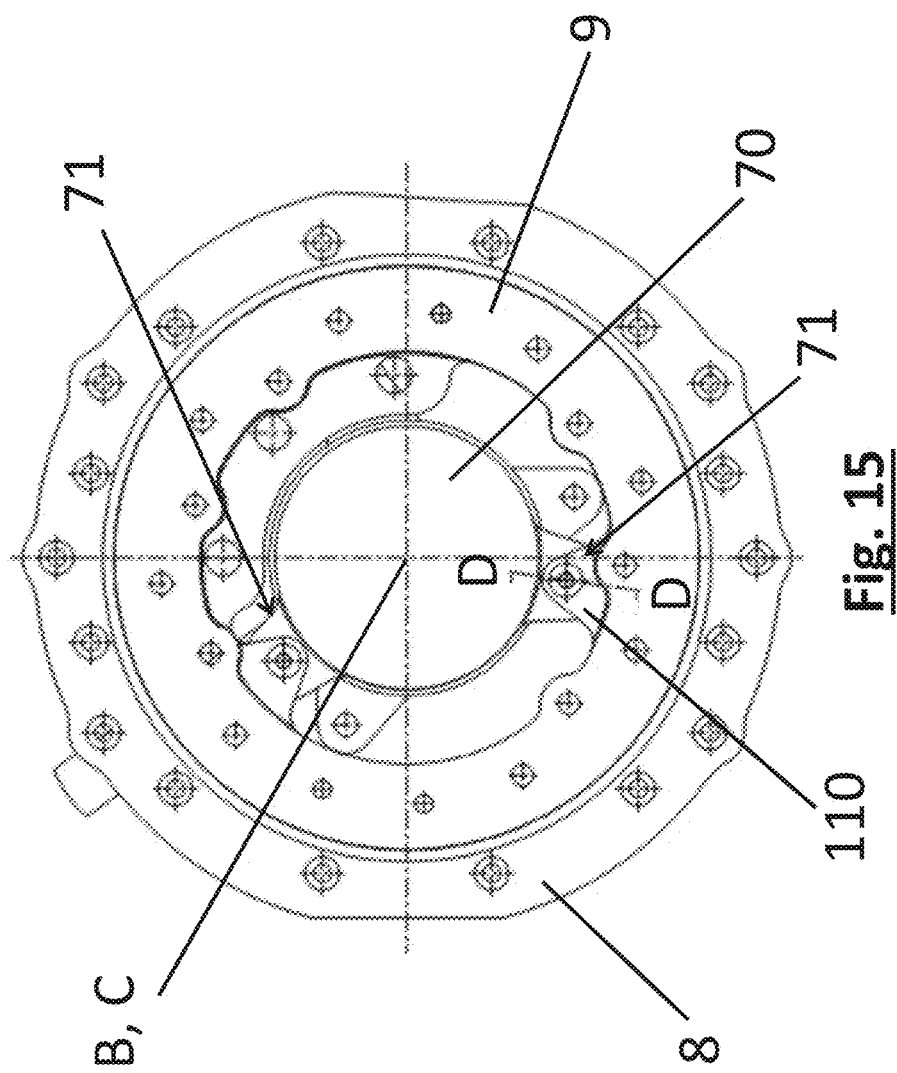
FIG. 15 shows a plan view of the rotational joint shown in FIG. 11, but including the rotational drive member.

The radially outer surfaces of the sleeve 126 have a corresponding radius and cross-sectional shape to those of the bush stem 124. In this regard the sleeve 126 has a pair of opposed radially outer surfaces that are spaced apart in the local circumferential direction (one of these surfaces 140a is shown in FIG. 14, but the other is hidden from view). Each of these surfaces is substantially planar and substantially parallel to the local radial direction (the radial direction at the longitudinal axis I of the coupling member 119), i.e. substantially perpendicular to the local circumferential direction.

These surfaces 140a of the sleeve 126 form a close-fit in the circumferential direction with the inner surfaces that define the bore 113 in the lower lug 111. In this respect the surfaces 140a of the sleeve 126 are in contact with the surfaces 116a, 116b that define the bore 113.

The sleeve 126 also has a pair of radially outer surfaces 130a, 130b that are spaced apart in the radial direction (see FIGS. 14 and 16). Each of these surfaces 130a, 130b is concavely curved, about the longitudinal axis I of the coupling member 119, and joins a respective pair of radially outer or inner sides (relative to the rotational axis B) of the radially extending surfaces 140a of the sleeve 126. Each of the curved surfaces 130a, 130b has a radius of curvature that is substantially the same as that of the adjacent curved surface 117a, 117b of the inner surface that defines the bore 113 in the lower lug 110.

However the radially extending surfaces 140a of the sleeve 126 have a shorter radial length than that of the sides 116a, 116b of the inner surface they are in contact with. Accordingly, the radial clearance 'R' is also provided between each curved side 130a, 130b of the sleeve 126 and the opposed curved side 117a, 117b of the internal surface that defines the bore 113. The radial clearance R is provided along substantially the entire axial length of the sleeve 126 that is contained within the bore 113.

Accordingly, as shown in FIGS. 16, 19 and 21a to 21c, the bores 112, 113 each have a (maximum) length in the radial direction that is greater than the length of the coupling member 119 in the radial direction.

The coupling member 119 is slidably mounted in the bores 112, 113 in the lugs 110, 111 of the inner race 9, such that it is slidable radially within the bores 112, 113. The coupling member 119 may move radially within the bores 112, 113 by movement of the coupling member 119 in the radial direction and/or by movement of the bores 112, 133 in the radial direction (i.e. movement of the lugs 110, 111 in the radial direction).

It will be appreciated that the sides 127a, 127b, 140a of the coupling member 119 (i.e. of the bush stem 124 and sleeve 126) bear against the opposed sides 116a, 116b of the surfaces of the lugs 110, 111 that define the bores 112, 113, to support the sliding in the radial direction.

It will also be appreciated that references to radial movement refers to movement in a direction with at least a component in the radial direction and, unless otherwise stated, does not require that the movement is parallel to the radial direction. In this regard, as described below, the lugs 110, 111 may move both axially and radially relative to the coupling member 119 and bearing assembly 131, as they rotate in the local radial plane relative to the coupling member 119 and bearing assembly 131, as the wing tip device 4 rotates from one configuration to the other.

The lug 114 of the drive shaft 70 is rotatably mounted to the coupling member 119, such that the lug 114 and coupling member 119 are rotatable relative to each other in the local radial plane (i.e. a plane perpendicular to the local circumferential direction), by a bearing assembly 131 (see FIG. 16). This accommodates misalignment of the coupling member 119 and the bore 115, where the longitudinal axes of the coupling member 119 and of the bore 115 are not parallel to each other.

The bearing assembly 131 comprises an outer bearing race 132 and an inner bearing race 133 (the terms 'outer' and 'inner' being used in a radial sense, relative to the longitudinal axis I of the coupling member 119).

The outer bearing race 132 is a substantially cylindrical hollow sleeve that has a radially outer surface that forms an interference fit with the internal surface 118 of the lug 114 that defines the bore 115. Accordingly, the outer bearing race 132 is fixed relative to the lug 114 (in both the axial and radial directions).

The inner bearing race 133 has the shape of a sphere with a bore 134 that extends in the axial direction, through the centre of the sphere. The bore 134 extends all the way through the axial length of the sphere and is defined by internal surfaces 135 of the inner bearing race 133.

The coupling member 119 is received in the bore 134 in the inner bearing race 133. The internal surfaces 135 have a corresponding shape to those of the radially outer surfaces of the sleeve 126 such that the inner bearing race 133 forms a close-fit with the sleeve 126. In this regard, the inner bearing race 133 is rotationally fixed to the coupling member 119.

The inner spherical bearing race 133 bears against, and is rotatable relative to, the outer cylindrical bearing race 132, in the local radial plane (i.e. about an axis in the local circumferential direction). Accordingly, the lug 114 is rotatably mounted to the coupling member 119 by the bearing assembly 131, such that the lug 114 is rotatable relative to the coupling member 119 in the local radial plane, However, the coupling member 119 is axially and radially fixed relative to the lug 114. In this regard it will be appreciated that, although the coupling member 119 is rotatable relative to the lug 114, in the radial plane, it cannot translate in the radial or axial directions relative to the lug 114.

The spacer 126 extends from the axially inboard surface of the bush stem 124 to the opposed axially inboard surface 201 of the bolt head 123 (axially inboard and outboard relative to the axial middle of the bearing assembly 131). In this way, the sleeve 126 spaces the heads 123, 125 apart by a pre-defined distance, i.e. the combined axial length of the sleeve 126 and the bush stem 124.

The heads 123, 125 act as retaining formations that limit the axial movement of the upper and lower lugs 110, 111 relative to the coupling member 119. In this regard, the inboard surfaces of the heads 123, 125 are brought into abutment with the outboard surfaces of the upper and lower lugs 110, 111 to limit the axial movement of the upper and lower lugs 110, 111 (which move axially together because they are fixed to each other) relative to the coupling member 119.

The combined axial length of the sleeve 126 and the bush stem 124 is greater than the axial distance between the axially outboard surfaces 203, 204 of the lugs 110, 111.

This allows the coupling member 119 to slide axially in the bores 112, 113. This may be by axial movement of the coupling member 119 and/or axial movement of the lugs 110, 111. It will be appreciated that, since the lugs 110, 111 are fixed to each other, they move together axially relative to the coupling member 119.

It will also be appreciated that references to axial movement refers to movement in a direction with at least a component in the axial direction and, unless otherwise stated, does not require that the movement is parallel to the axial direction. In this regard, as described below, the lugs 110, 111 may move both axially and radially relative to the coupling member 119 and bearing assembly 131, as they rotate in the local radial plane relative to the coupling member 119 and bearing assembly 131, as the wing tip device 4 rotates from one configuration to the other.

An axial clearance 'A' is provided between each axially outboard side 136 of the inner bearing race 133 and the opposed, axially inboard, surface 137 of the upper and lower lug 110, 111 respectively.

With reference to FIG. 16 it will be appreciated that the axial clearance 'A' is present in four locations, namely on each axial side of the inner bearing race 133 and radially inwardly and outwardly of the coupling member 119.

In the embodiment described above, the rotational axis C of the drive shaft 70 is co-axial with the rotational axis B of the inner and outer races 8, 9.

The radially inner periphery of the inner race 9, that the lugs 110, 111 are mounted on, is substantially circular. Accordingly, the lugs 110, 111 follow a substantially circular path, about the rotational axis B of the inner and outer races 8, 9, as the wing tip device 4 rotates from one configuration to the other.

Similarly, the radially outer periphery of the drive shaft 70, that the lug 114 is mounted on, is substantially circular. Accordingly, the lug 114 follows a substantially circular path, about the rotational axis C of the drive shaft 70, as the wing tip device 4 rotates from one configuration to the other.

The bores 112, 113, 115 of the lugs 110, 111, 114 are positioned such that, when the rotational axes of the drive shaft 70 and of the inner and outer races 8, 9 are co-axial, the longitudinal axes of the bores 112, 113, 115 are co-axial. Accordingly, if the rotational axes are co-axial, the lugs 110, 111 of the inner race 9 do not move axially or radially relative to the lug 114 of the drive shaft 70.

However, the drive shaft 70 and the inner race 9 may be, or become, misaligned such that the rotational axis C of the drive shaft 70 is offset from the rotational axis B of the inner race 9 (e.g. due to manufacturing tolerances, unintended movement during use or during subsequent disassembly and reassembly). An arrangement of the rotational joint 101, with this offset, is shown where the drive shaft (not shown in this arrangement) is positioned with its rotational axis C' in the position shown in FIG. 14 (i.e. offset from the rotational axis B).

As the wing tip device 4 rotates from one configuration to the other, the lugs 110, 111 of the inner race 9 rotate about the rotational axis B and the lug 114 rotates about the axis C'. Accordingly, due to the offset, as the lugs rotate, the lug 114 moves radially relative to the lugs 110, 111. Therefore, since the coupling member 119 is radially fixed to the lug 114, the coupling member 119 slides radially in the bores 112, 113 in the lugs 110, 111.

Figures 21A, 21B, 21C:
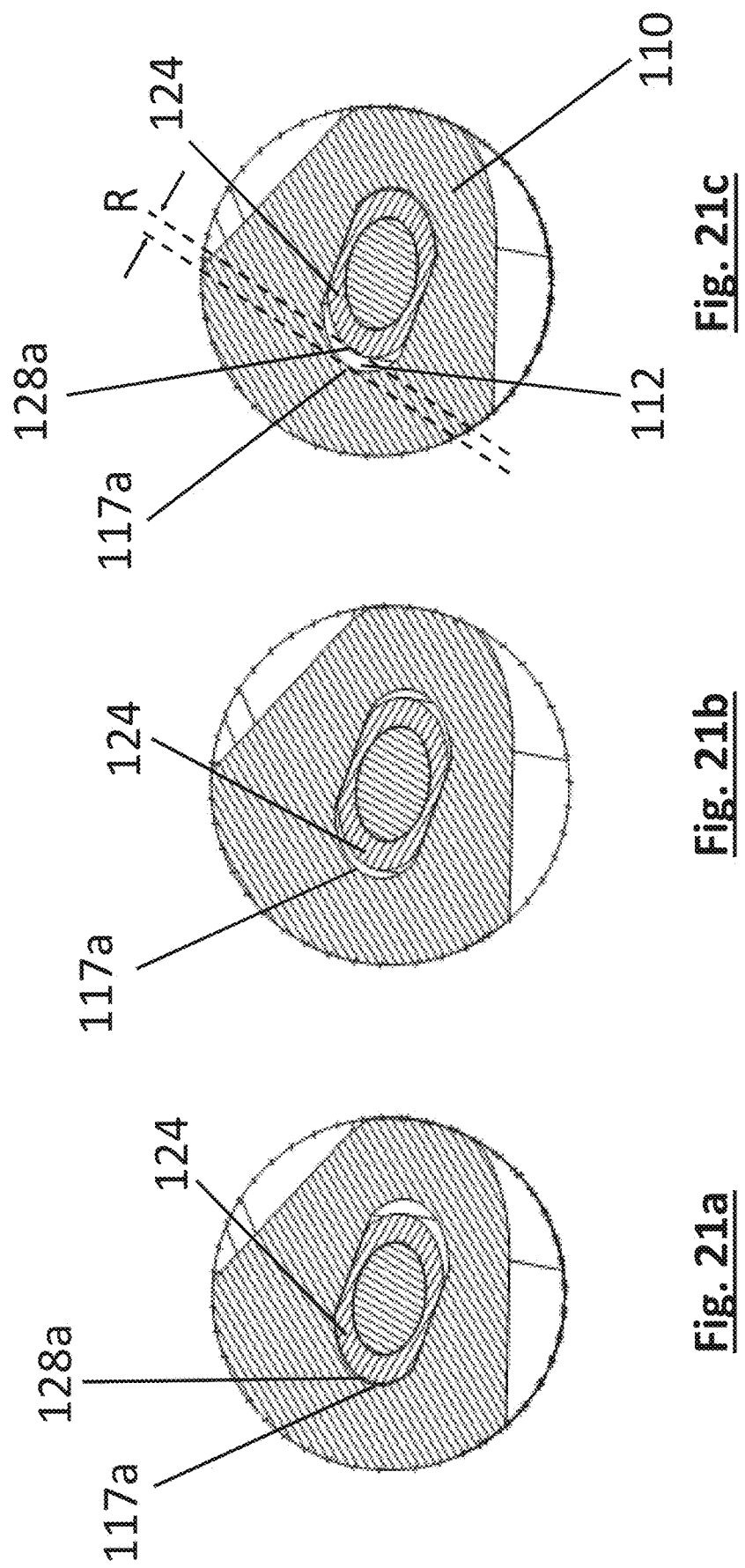
FIGS. 21a to 21c are each a perspective view of the region shown in FIG. 19 and illustrate the variation in radial distance R between the coupling member 119 and the inner radial side 117a of the bore 112 in the lug 110 as the wing tip device rotates between the flight and ground configurations.

FIGS. 21a to 21c show the radial movement of the coupling member 119 in the bores 112, 113 as the wing tip device 4 rotates between the flight configuration (FIG. 21a) and the ground configuration (FIG. 21c). FIG. 21b is an intermediary position of the wing tip device 4 between the flight and ground configurations. It will be appreciated that the size of the radial clearance 'R' varies as the wing tip device 4 rotates from one configuration to the other.

The length of each bore 112, 113 in the radial direction is greater than the length of the coupling member 119 in the radial direction by an amount that accommodates the extent of this radial movement.

This is such that as the wing tip device 4 rotates from the flight configuration to the ground configuration (and vice-versa), there is always at least some finite radial clearance R between each radial end (i.e. the radially inner or outer end) of the coupling member 119 and the opposed radial end of the bore 112, 113, as shown in FIGS. 21a and 21c.

This may reduce or eliminate undesirable forces that would otherwise be exerted on the drive shaft 70, and therefore on the geared rotary actuator 42.

Alternatively or additionally, the drive shaft 70 and the inner race 9 may be, or become misaligned such that the rotational axis C of the drive shaft 70 is inclined relative to (i.e. non-parallel with) the rotational axis B of the inner race 9. An arrangement of the rotational joint 101, where the rotational axis C of the drive shaft 70 is inclined relative to and offset from the rotational axis B of the inner race 9 is shown where the drive shaft (not shown in this arrangement) is positioned with its rotational axis C" in the position shown in FIG. 14.

In this case, as the wing tip device 4 rotates from one configuration to the other, the lug 114 moves radially and axially relative to the lugs 110, 111. Since the coupling member 119 is fixed to the lug 114, this causes the coupling member 119 to move axially and radially relative to the lugs 110, 111. This may be regarded as a rotation of the lugs 110, 111 in the local radial plane relative to the lug 114, and therefore relative to the coupling member 119.

Figure 20C:
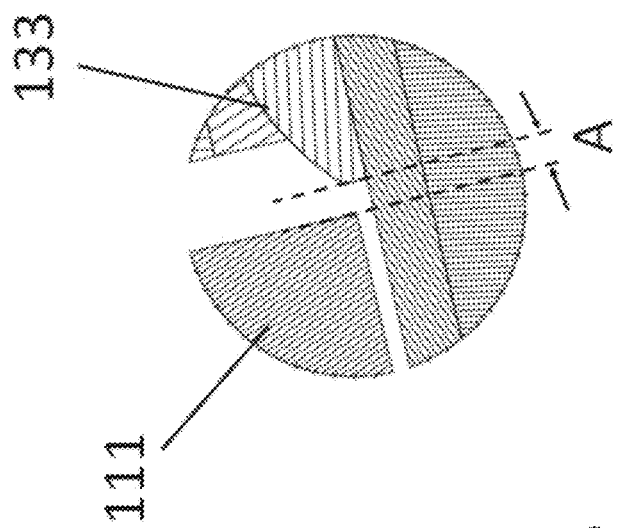
FIGS. 20a to 20c are each an enlarged view of the region labelled K in FIG. 16 and illustrate the variation in axial distance A between the lug 111 and the inner bearing race 133 as the wing tip device rotates between the flight and ground configurations.
Figure 20B:
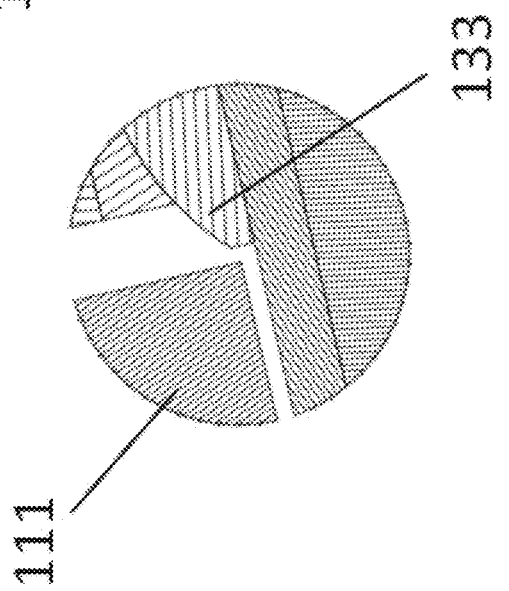
Figure 20A:
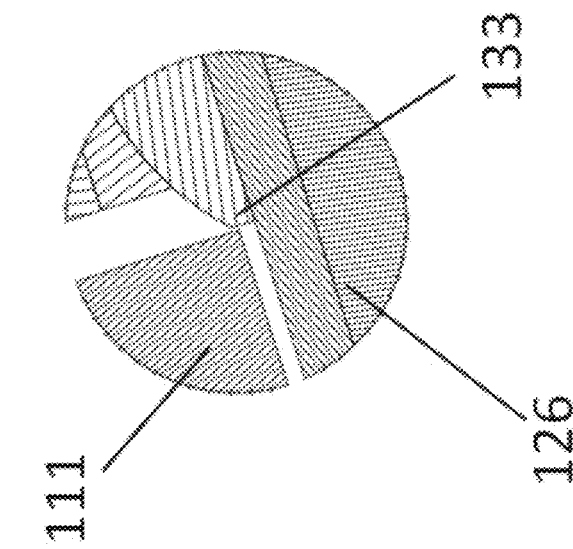

FIGS. 20a to 20c show the axial movement of the coupling member 119 in the bores 112, 113 as the wing tip device 4 rotates between the flight configuration (FIG. 20a) and the ground configuration (FIG. 20c). FIG. 20b is an intermediary position of the wing tip device 4 between the flight and ground configurations. It will be appreciated that the size of the axial clearance 'A' varies as the wing tip device 4 rotates from one configuration to the other.

The size of the axial clearance 'A' is determined by the combined axial length of the sleeve 126 and the bush stem 124 (as this determines the limits of axial movement of the lugs 110, 111 of the inner race 9 relative to the inner bearing race 133), the axial thickness of the lugs 110, 111 and the axial length of the inner bearing race 133.

The inboard surfaces of the heads 123, 125 are axially spaced from the inner bearing race 133 by a distance, and the lugs 110, 111 have an axial thickness, such that there is always at least some finite axial clearance A as the wing tip device 4 rotates between the ground and flight configurations (as shown in FIGS. 20a and 20c).

This may reduce or eliminate undesirable forces that would otherwise be exerted on the drive shaft 70, and therefore on the geared rotary actuator 42.

Whilst the present invention has been described and illustrated with reference to particular embodiments, it will be appreciated by those of ordinary skill in the art that the invention lends itself to many different variations not specifically illustrated herein.

For example, in the currently described embodiment, the inner race 9 comprises the female member 72 and the outer race 8 comprises the male member 76. Alternatively, the inner race 9 may comprise the male member 76, with the outer race 8 comprising the female member 72. It will be appreciated that, in this case, the outer race 9 is split into first and second parts and the method of assembling the rotational joint 101 comprises receiving the inner race 9 in the outer race 8 by positioning the first and second parts of the outer race 8 radially outwardly of the inner race 9, on opposite axial sides of the inner race 9, and bringing them together over the inner race 9, to form the female member 72 about the male member 76.

In the currently described embodiment the inner race 9 is rotatably fixed relative to the wing tip device 4, such that it rotates with the wing tip device 4 and the outer race 8 is rotatably fixed relative to the fixed wing 3. Alternatively, the outer race 8 may be rotatably fixed relative to the wing tip device 4, such that it rotates with the wing tip device 4, with the inner race 9 rotatably fixed relative to the fixed wing 3.

In the currently described embodiment, when the male member 76 is received in the female member 72, the male member 76 forms a close axial and radial fit with the female member 72. In this regard, the male member 76 forms a zero clearance fit with the female member 72. Alternatively, the male member 76 may not form a zero clearance fit with the female member 72. In this regard, there may be axial and/or radial gaps between the male member 76 and the female member 72. It will be appreciated that, in this case, the receipt of the male member 76 in the female member 72, with the female member 72 overlapping the male member 76 in the axial and radial directions will still act to radially and axially retain the inner race 9 relative to the outer race 8 since the engagement of the male member 72 with the female member 76 will limit the extent of any relative radial and axial movement.

However, it is preferable that the male member 72 forms a zero-clearance fit with the female member 72 since axial or radial movement of the inner race 9 relative to the outer race 8 is not desirable.

Similarly, when the inner ring 9 is received in the outer ring 8, there may be a radial gap between the two such that a small amount of radial movement of the inner ring 9 relative to the outer ring 8 is possible but limited. However, it is preferable that the inner ring 9 forms a close radial fit with the outer ring 8 since radial movement of the inner race 9 relative to the outer race 8 is not desirable.

In the currently described embodiment the inner ring 9 is split into first and second parts 9a, 9b along a radial plane C that is perpendicular to the rotational axis B and located midway along the axial length of the inner race 9. It will be appreciated that the shape, position and orientation of the radial plane C may be varied. For example, the inner ring 9 may be split into first and second parts along a non-planar interface, e.g. a curved or stepped interface. As a further example, the first and second parts 9a, 9b may be split along a radial plane that is parallel to the rotational axis B. In this case, the first and second parts 9a, 9b may each be placed over the male member and rotated together into axial alignment with each other, into the assembled position (similar to the closing of two double doors at the same time).

It will be appreciated that the male and female members 72, 76 may have different shapes to those in the described embodiment. The space defined by the internal face 74 of the female member 72 may be a groove, recess, or channel, with any suitable shape for example. The male member may be a radially extending protrusion with any suitable shape.

It will also be appreciated that the shapes of the inner and outer races 9, 8 may be varied. In this regard, the inner and outer races 9, 8 may be arcuate members that do not form complete rings.

In the described embodiment, when the first and second parts of the inner ring 9a, 9b are assembled together to form the female member 72, the first and second parts 9a, 9b are in contact with each other. Alternatively, when the first and second parts of the inner ring 9a, 9b are assembled together to form the female member 72, they may be spaced apart.

In the currently described embodiment the male member 76 is integrally formed with the inner race 9. Alternatively, the male member 76 may be separately formed to a part of the inner race and attached to it to form part of the inner race 9.

Disclosed herein is a method of assembly of an aircraft wing (1) comprising a fixed wing (3) and a wing tip device (4) rotatably coupled to the fixed wing (3), to rotate between flight and ground configurations, by a rotational joint (101) having an outer race (8) and an inner race (9) that is received in the outer race (8), configured such that the inner and outer races are rotatable relative to each other about a rotational axis, one of the inner and outer races is rotationally fixed relative to the wing tip device (4) and the other is rotationally fixed relative to the fixed wing (3), one of the inner and outer races comprises a male member (76) and the other is a two-part assembly comprising a first part (9a) and a second part (9b) that together form a female member (72), the method comprising assembling the rotational joint (101) by bringing the first and second parts together to form the female member (72) about the male member (76) such that the male member (76) is received in the female member (72) and fixing the first and second parts (9a, 9b) relative to each other such that the race that is rotationally fixed relative to the wing tip device (4) is axially and radially retained relative to the race that is rotationally fixed relative to the fixed wing (3), the method further comprising rotatably coupling the wing tip device (4) to the fixed wing (3) by the rotational joint (101).

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method of assembly of an aircraft wing, the aircraft wing comprising a fixed wing and a wing tip device at the tip of the fixed wing, the wing tip device being rotatable relative to the fixed wing between:
   a flight configuration for use during flight, and
   a ground configuration for use during ground-based operations, in which ground configuration the wing tip device is rotated relative to the fixed wing such that the span of the wing is reduced,
   the aircraft wing comprising a rotational joint that rotatably couples the wing tip device to the fixed wing, to allow the wing tip device to rotate relative to the fixed wing between the flight and ground configurations,
   the rotational joint comprising an outer race and an inner race that is received in the outer race, radially inwardly of the outer race, configured such that the inner and outer races are rotatable relative to each other about a rotational axis,
   one of the inner and outer races is rotationally fixed relative to the wing tip device and the other is rotationally fixed relative to the fixed wing such that as the wing tip device rotates relative to the fixed wing, the inner and outer races are rotated relative to each other about the rotational axis,
   one of the inner and outer races comprises a male member and the other comprises a female member, configured such that when the male member is received in the female member, the race that is rotationally fixed relative to the wing tip device is axially and radially retained relative to the race that is rotationally fixed relative to the fixed wing,
   wherein the race that comprises the female member is a two-part assembly comprising a first part and a second part that together form the female member and
   wherein the method comprises the steps of assembling the rotational joint by receiving the inner race in the outer race by bringing the first and second parts together to form the female member about the male member such that the male member is received in the female member and fixing the first and second parts relative to each other such that the race that is for being rotationally fixed relative to the wing tip device is axially and radially retained relative to the race that is for being rotationally fixed relative to the fixed wing,
   wherein, when the aircraft wing is assembled, the wing tip device and the fixed wing are separated along an oblique cut plane passing through upper and lower surfaces of the wing, and the wing tip device is rotatable between the flight and ground configurations, about an axis of rotation oriented normal to the oblique cut plane, such that the fixed wing and the wing tip device do not clash when rotating between the flight and ground configurations.

2. The method of assembly according to claim 1 wherein the inner race is received in the outer race by bringing the first and second parts together from opposite axial sides of the male member to form the female member about the male member such that the male member is received in the female member.

3. The method of assembly according to claim 1 wherein the outer race comprises the male member and the inner race comprises the female member, wherein assembling the rotational joint comprises receiving the inner race in the outer race by receiving the first and second parts through opposite axial ends of the outer race and bringing the first and second parts together to form the female member about the male member.

4. The method of assembly according to claim 1 wherein the inner and outer races are configured such that when the male member is received in the female member, the radially inner periphery of the outer race and the radially outer periphery of the inner race cooperate such that the race that is for being rotationally fixed relative to the wing tip device is radially retained relative to the race that is for being rotationally fixed relative to the fixed wing.

5. The method of assembly according to claim 1 wherein the male and female members are configured such that when the male member is received in the female member, the male and female members axially overlap such that the race that is for being rotationally fixed relative to the wing tip device is radially retained relative to the race that is for being rotationally fixed relative to the fixed wing.

6. The method of assembly according to claim 5 wherein an internal face of the female member defines a space for receiving the male member and, when the male member is received in the female member, the internal face of the female member axially overlaps the male member such that the race that is for being rotationally fixed relative to the wing tip device is radially retained relative to the race that is for being rotationally fixed relative to the fixed wing.

7. The method of assembly according to claim 1 wherein when the male member is received in the female member, the inner and outer races are radially fixed relative to each other.

8. The method of assembly according to claim 7 wherein when the male member is received in the female member, the inner race forms a radial fit with the outer race.

9. The method of assembly according to claim 7 wherein when the male member is received in the female member, the male member forms a radial fit with the female member.

10. The method of assembly according to claim 1 wherein the male and female members are configured such that when the male member is received in the female member, the inner and outer races are axially fixed relative to each other.

11. The method of assembly according to claim 1 wherein the male and female members are configured such that when the male member is received in the female member, the male member forms a zero clearance fit with the female member.

12. The method of assembly according to claim 1 wherein the male and female members are configured such that as the inner and outer races are rotated relative to each other, the male and female members cooperate with each other to guide the relative rotation.

13. A method of assembling an assembly of an aircraft comprising the method of assembling the aircraft wing according to the method of claim 1 and further comprising assembling the aircraft wing with an aircraft fuselage.

14. A method of assembly a rotational joint for rotatably coupling a wing tip device to a fixed wing such that the wing tip device is rotatable relative to the fixed wing between:
   a flight configuration for use during flight, and
   a ground configuration for use during ground-based operations, in which ground configuration the wing tip device is rotated relative to the fixed wing such that the span of the wing is reduced,
   the rotational joint comprising an outer race and an inner race that is received in the outer race, radially inwardly of the outer race, configured such that the inner and outer races are rotatable relative to each other about a rotational axis,
   one of the inner and outer races is configured to be rotationally fixed relative to a wing tip device and the other is configured to be rotationally fixed relative to a fixed wing, wherein the inner and outer races are rotated relative to each other about the rotational axis,
   one of the inner and outer races comprises a male member and the other comprises a female member, configured such that when the male member is received in the female member, the race that is rotationally fixed relative to the wing tip device is axially and radially retained relative to the race that is rotationally fixed relative to the fixed wing,
   wherein the race that comprises the female member is a two-part assembly comprising a first part and a second part that together form the female member,
   wherein the method comprises the steps of assembling the rotational joint by receiving the inner race in the outer race by bringing the first and second parts together to form the female member about the male member such that the male member is received in the female member and fixing the first and second parts relative to each other such that the race that is for being rotationally fixed relative to the wing tip device is axially and radially retained relative to the race that is for being rotationally fixed relative to the fixed wing, and wherein an internal face of the female member and an external face of the male member each have a cross-sectional shape that is curved.

15. A method of assembly of an aircraft wing including the assembly of the rotational joint of claim 14, and assembling the wing tip device and the fixed wing such that the rotational joint joins the wing tip device to the fixed wing.

16. A method of assembly of an aircraft including the assembly of the aircraft wing in claim 15 and assembling the fixed wing to a fuselage of the aircraft.

17. A method of assembly of a rotational joint for rotatably coupling a wing tip device to a fixed wing such that the wing tip device is rotatable relative to the fixed wing between:
   a flight configuration for use during flight, and
   a ground configuration for use during ground-based operations, in which ground configuration the wing tip device is rotated relative to the fixed wing such that the span of the wing is reduced,
   the rotational joint comprising an outer race and an inner race that is received in the outer race, radially inwardly of the outer race, configured such that the inner and outer races are rotatable relative to each other about a rotational axis,
   one of the inner and outer races is for being rotationally fixed relative to the wing tip device and the other is for being rotationally fixed relative to the fixed wing such that as the wing tip device rotates relative to the fixed wing, the inner and outer races are rotated relative to each other about the rotational axis,
   one of the inner and outer races comprises a male member and the other comprises a female member, configured such that when the male member is received in the female member, the race that is for being rotationally fixed relative to the wing tip device is axially and radially retained relative to the race that is for being rotationally fixed relative to the fixed wing,
   wherein the race that comprises the female member is a two-part assembly comprising a first part and a second part that together form the female member,
   wherein the method comprises the steps of receiving the inner race in the outer race by bringing the first and second parts together to form the female member about the male member such that the male member is received in the female member and fixing the first and second parts relative to each other such that the race that is for being rotationally fixed relative to the wing tip device is axially and radially retained relative to the race that is for being rotationally fixed relative to the fixed wing, and
   wherein, when the aircraft wing is assembled, the wing tip device and the fixed wing are separated along an oblique cut plane passing through upper and lower surfaces of the wing, and the wing tip device is rotatable between the flight and ground configurations, about an axis of rotation oriented normal to the oblique cut plane, such that the fixed wing and the wing tip device do not clash when rotating between the flight and ground configurations.

18. An aircraft wing comprising a fixed wing and a wing tip device at the tip of the fixed wing, the wing tip device being rotatable relative to the fixed wing between:
   a flight configuration for use during flight, and
   a ground configuration for use during ground-based operations, in which ground configuration the wing tip device is rotated relative to the fixed wing such that the span of the wing is reduced, the aircraft wing comprising a rotational joint that rotatably couples the wing tip device to the fixed wing, to allow the wing tip device to rotate relative to the fixed wing between the flight and ground configurations, the rotational joint comprising an outer race and an inner race that is received in the outer race, radially inwardly of the outer race, configured such that the inner and outer races are rotatable relative to each other about a rotational axis, one of the inner and outer races is rotationally fixed relative to the wing tip device and the other is rotationally fixed relative to the fixed wing such that as the wing tip device rotates relative to the fixed wing, the inner and outer races are rotated relative to each other about the rotational axis, one of the inner and outer races comprises a male member and the other comprises a female member, wherein the male member is received in the female member such that the race that is rotationally fixed relative to the wing tip device is axially and radially retained relative to the race that is rotationally fixed relative to the fixed wing, wherein the race that comprises the female member is a two-part assembly comprising a first part and a second part that together form the female member and the first and second parts are assembled together to form the female member about the male member such that the male member is received in the female member, and the first and second parts are fixed relative to each other such that the race that is rotationally fixed relative to the wing tip device is axially and radially retained relative to the race that is rotationally fixed relative to the fixed wing, wherein the wing tip device and the fixed wing are separated along an oblique cut plane passing through upper and lower surfaces of the wing, and the wing tip device is rotatable between the flight and ground configurations, about an axis of rotation orientated normal to the oblique cut plane, such that the fixed wing and the wing tip device do not clash when rotating between the flight and ground configurations.

19. An aircraft comprising an aircraft wing according to claim 18.

20. A rotational joint for rotatably coupling a wing tip device to a fixed wing such that the wing tip device is rotatable relative to the fixed wing between:
  a flight configuration for use during flight, and
  a ground configuration for use during ground-based operations, in which ground configuration the wing tip device is rotated relative to the fixed wing such that the span of the wing is reduced,
  the rotational joint comprising an outer race and an inner race that is received in the outer race, radially inwardly of the outer race, configured such that the inner and outer races are rotatable relative to each other about a rotational axis,
  one of the inner and outer races is for being rotationally fixed relative to the wing tip device and the other is for being rotationally fixed relative to the fixed wing such that as the wing tip device rotates relative to the fixed wing, the inner and outer races are rotated relative to each other about the rotational axis,
  one of the inner and outer races comprises a male member and the other comprises a female member, wherein the male member is received in the female member such that the race that is for being rotationally fixed relative to the wing tip device is axially and radially retained relative to the race that is for being rotationally fixed relative to the fixed wing,
  wherein the race that comprises the female member is a two-part assembly comprising a first part and a second part that together form the female member and the first and second parts are assembled together to form the female member about the male member such that the male member is received in the female member,
  wherein the first and second parts are fixed relative to each other such that the race that is for being rotationally fixed relative to the wing tip device is axially and radially retained relative to the race that is for being rotationally fixed relative to the fixed wing, and
  wherein an internal face of the female member and an external face of the male member each have a cross-sectional shape that is curved.

21. An aircraft wing comprising the rotational joint of claim 20 coupling the wing tip device to the fixed wing.

22. An aircraft comprising the aircraft wing of claim 21 and a fuselage to which is attached the fixed wing.

* * * * *